(12) United States Patent
Otake

(10) Patent No.: US 10,239,537 B2
(45) Date of Patent: Mar. 26, 2019

(54) VEHICLE TRAVELING CONTROL APPARATUS

(71) Applicant: TOYOTA JIDOSHA KABUSHIKI KAISHA, Toyota-shi (JP)

(72) Inventor: Hirotada Otake, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 18 days.

(21) Appl. No.: 15/489,936

(22) Filed: Apr. 18, 2017

(65) Prior Publication Data

US 2018/0037235 A1 Feb. 8, 2018

(30) Foreign Application Priority Data

Aug. 8, 2016 (JP) .................................. 2016-155793

(51) Int. Cl.
| | | |
|---|---|---|
| *B60W 40/08* | (2012.01) | |
| *B60W 10/18* | (2012.01) | |
| *B60W 10/20* | (2006.01) | |
| *B60W 30/12* | (2006.01) | |

(Continued)

(52) U.S. Cl.
CPC ............. *B60W 40/08* (2013.01); *B60K 28/06* (2013.01); *B60W 10/18* (2013.01); *B60W 10/20* (2013.01); *B60W 30/12* (2013.01); *B62D 5/0463* (2013.01); *B60W 2040/0818* (2013.01); *B60W 2420/42* (2013.01); *B60W 2420/52* (2013.01); *B60W 2510/18* (2013.01); *B60W 2510/202* (2013.01); *B60W 2520/04* (2013.01); *B60W 2520/10* (2013.01); *B60W 2540/18* (2013.01); *B60W 2540/26* (2013.01); *B60W 2550/10* (2013.01); *B60W 2550/143* (2013.01); *B60W 2550/146* (2013.01); *B60W 2550/302* (2013.01); *B60W 2550/304* (2013.01); *B60W 2550/308* (2013.01); *B60W 2710/18* (2013.01); *B60W 2710/202* (2013.01); *B60W 2720/10* (2013.01);

(Continued)

(58) Field of Classification Search
CPC ........ B60W 40/08; B60W 2040/0818; B60W 2050/0071; B60W 10/08; B60T 7/12
USPC ...................................................... 701/70, 93
See application file for complete search history.

(56) References Cited

U.S. PATENT DOCUMENTS

| | | | |
|---|---|---|---|
| 2013/0311043 A1 | 11/2013 | Kobana et al. | |
| 2014/0114536 A1* | 4/2014 | Kobana .................. | B60K 28/06 701/49 |

(Continued)

FOREIGN PATENT DOCUMENTS

| | | |
|---|---|---|
| JP | 2006-315491 | 11/2006 |
| JP | 2008-195402 | 8/2008 |
| JP | 4172434 | 10/2008 |

(Continued)

*Primary Examiner* — Isaac G Smith
(74) *Attorney, Agent, or Firm* — Oblon, McClelland, Maier & Neustadt, L.L.P.

(57) ABSTRACT

A vehicle traveling control apparatus of the invention stops a vehicle by causing a braking force applying device to apply a braking force to the vehicle after determining that a driver is under an abnormal state. When a stop of a control for maintaining a vehicle at a stopped state is requested while a shift lever is set at a range other than parking and neutral ranges, the apparatus limits a driving force requested for a driving force supplying device to supply to drive wheels, to a value smaller than a driver's requesting driving force.

7 Claims, 9 Drawing Sheets

(51) Int. Cl.
*B62D 5/04* (2006.01)
*B60K 28/06* (2006.01)
(52) U.S. Cl.
CPC . *B60W 2750/302* (2013.01); *B60W 2750/304* (2013.01); *B60W 2750/308* (2013.01)

(56) References Cited

U.S. PATENT DOCUMENTS

2014/0117651 A1  5/2014  Enzaki
2017/0232973 A1  8/2017  Otake

FOREIGN PATENT DOCUMENTS

| | | |
|---|---|---|
| JP | 2009-190464 | 8/2009 |
| JP | 4349210 | 10/2009 |
| JP | 2010-6279 | 1/2010 |
| JP | 4929777 | 5/2012 |
| JP | 2012-232618 | 11/2012 |
| JP | 2013-152700 | 8/2013 |
| JP | 2014-148293 | 8/2014 |
| JP | 2015-89725 | 5/2015 |
| WO | WO 2012/105030 A1 | 8/2012 |

\* cited by examiner

VEHICLE TRAVELING CONTROL APPARATUS

BACKGROUND OF THE INVENTION

Field of the Invention

The invention relates to a vehicle traveling control apparatus for braking a vehicle to stop the vehicle when a driver of the vehicle is under an abnormal state that the driver loses an ability of driving the vehicle.

Description of the Related Art

There is proposed an apparatus which determines whether or not a driver of a vehicle is under an abnormal state that the driver loses an ability of driving the vehicle, for example, a state that the driver sleeps and a state that a mind and body function of the driver stops and which brakes the vehicle to stop the vehicle when determining that the driver is under the abnormal state (refer to WO 2012/105030). Hereinafter, this apparatus will be referred to as "the conventional apparatus".

The conventional apparatus executes a stopped state maintaining control for maintaining the vehicle at a stopped state by forbidding an acceleration of the vehicle on the basis of a change of an operation amount of an acceleration pedal of the vehicle after stopping the vehicle. Hereinafter, the acceleration of the vehicle on the basis of the change of the operation amount of the acceleration pedal will be referred to as "the acceleration pedal operation override".

In addition, the conventional apparatus includes a stop request button which is operated for requesting the stop of the stopped state maintaining control.

When the stop request button is operated, the conventional apparatus stops the stopped state maintaining control.

After the vehicle is stopped deriving from the determination that the driver is under the abnormal state, a rescuer and the like for rescuing the driver may mistakenly operate the stop request button and as a result, the stop of the stopped state maintaining control may be mistakenly requested.

If the driver operates the acceleration pedal when the stopped state maintaining control is stopped deriving from the mistaken request of the stop of the stopped state maintaining control and as a result, the forbidding of the acceleration pedal operation override is cancelled, the vehicle is suddenly accelerated during a rescuing of the driver.

SUMMARY OF THE INVENTION

The invention has been made for solving the aforementioned problem. An object of the invention is to provide a vehicle traveling control apparatus which can prevent the vehicle from being suddenly accelerated when the stop of the stopped state maintaining control is mistakenly requested while the vehicle is maintained at the stopped state by the stopped state maintaining control.

One of the vehicle traveling control apparatus according to the invention (hereinafter, will be referred to as "the first invention apparatus") is applied to a vehicle comprising a shift lever (21), drive wheels, a driving force supplying device (32) and a braking force applying device (41, 42, 51). The driving force supplying device (32) supplies, to the drive wheels, a driving force for traveling the vehicle. The braking force applying device (41, 42, 51) applies, to the vehicle, a braking force for braking the vehicle.

The first invention apparatus comprises an electric control unit (10, 30, 40, 50). The electric control unit (10, 30, 40, 50) is configured to continuously determine whether or not a driver of the vehicle is under an abnormal state that the driver loses an ability of driving the vehicle (refer to processes of a step 315 in FIG. 3, a step 410 in FIG. 4 and a step 515 in FIG. 5). The electric control unit (10, 30, 40, 50) is further configured to execute a vehicle stop control for stopping the vehicle by causing the braking force applying device (32) to apply the braking force to the vehicle (refer to a process of a step 525 in FIG. 5) after the electric control unit (10, 30, 40, 50) determines that the driver is under the abnormal state (refer to determinations "Yes" at the step 315 in FIG. 3, the step 410 in FIG. 4 and the step 515 in FIG. 5).

The electric control unit (10, 30, 40, 50) is further configured to perform a first driving force limiting for limiting a supply request driving force (TQdreq) requested for the driving force supplying device (32) to supply to the drive wheels on the basis of a driver request driving force (TQd) requested by the driver to a value equal to or smaller than a first driving force (TQ1) smaller than the driver request driving force (TQd) and execute a stopped state maintaining control for maintaining the vehicle at a stopped state by performing a continuous braking for continuously applying the braking force to the vehicle from the braking force applying device (41, 42, 51) (refer to a process of a step 540) when the electric control unit (10, 30, 40, 50) stops the vehicle by the vehicle stop control (refer to a determination "No" at a step 510 in FIG. 5).

The electric control unit (10, 30, 40, 50) is further configured to stop the first driving force limiting (refer to processes of a step 620 in FIG. 6 and a step 710 in FIG. 7) when a stop of the stopped state maintaining control is requested during an execution of the stopped state maintaining control (refer to determinations "Yes" at steps 605 and 610) while the shift lever (21) is set at any of a parking range and a neutral range (refer to a determination "Yes" at a step 615).

When the shift lever is set at any of the parking and neutral ranges, the first driving force limiting is stopped and as a result, even when the driver request driving force is set as the supply request driving force, a possibility that the vehicle is suddenly accelerated, is extremely small. The first invention apparatus uses a condition that the shift lever is set at any of the parking and neutral ranges as a condition for stopping the first driving force limiting. Thus, even when the stop of the stopped state maintaining control is mistakenly requested, the vehicle can be prevented from being suddenly accelerated.

In addition, the electric control unit (10, 30, 40 and 50) is further configured to stop the first driving force limiting and perform a second driving force limiting for limiting the supply request driving force (TQdreq) to a value equal to or smaller than a second driving force (TQ2) which is equal to or larger than the first driving force (TQ1) and is smaller than the driver request driving force (TQdreq) (refer to processes of a step 632 in FIG. 6 and a step 810 in FIG. 8) when the stop of the stopped state maintaining control is requested during the execution of the stopped state maintaining control (refer to the determinations "Yes" at the steps 605 and 610 in FIG. 6) while the shift lever (21) is set at a range other than the parking and neutral ranges (refer to a determination "No" at the step 615 in FIG. 6 and determination "No" at a step 630 in FIG. 6).

When the driving force corresponding to the driver request driving force is supplied from the driving force supplying device to the vehicle while the shift lever is set at the range other hand the parking and neutral ranges, the vehicle may be suddenly accelerated. The first invention apparatus limits the supply request driving force to the value equal to or smaller than the second driving force which is smaller than the driver request driving force. Thus, even when the stop of the stopped state maintaining control is mistakenly requested, the vehicle can be prevented from being suddenly accelerated.

In the first invention apparatus, the second driving force (TQ2) may be equal to the first driving force (TQ1). In this case, the first and second driving forces may be set to zero.

When the second driving force is set as such and the stop of the stopped state maintaining control is requested while the shift lever is set at the range other than the parking and neutral ranges, the first driving force limiting substantially continues. Thus, a process for limiting the driving force supplied to the vehicle in order to prevent the sudden acceleration of the vehicle, can be simplified.

In the first invention apparatus, the electric control unit (10, 30, 40, 50) may be configured to stop the second driving force limiting (refer to the processes of the step 620 in FIG. 6 and the step 710 in FIG. 7) when a predetermined threshold time (T4th) elapses from a time when the electric control unit (10, 30, 40, 50) starts the second driving force limiting.

When a certain time elapses from a time when the stop of the stopped maintaining control is requested, a possibility that a rescue of the driver under the abnormal state is completed, is large. In this case, if the stop of the stopped state maintaining control is permitted, a possibility that the vehicle is suddenly accelerated, is small. Thus, it is preferred to permit the stop of the stopped state maintaining control in order to accomplish a request of a person who requests the stop of the stopped state maintaining control. The first invention apparatus stops the second driving force limiting when a certain time (the predetermined threshold time) elapses from the time when the first invention apparatus starts the second driving force limiting, that is, when the certain time (the predetermined threshold time) elapses from the time when the stop of the stopped state maintaining control is requested. Thus, the request of the person who requests the stop of the stopped state maintaining control can be accomplished.

Further, in the first invention apparatus, the electric control unit (10, 30, 40, 50) may be configured to permit a stop of the continuous braking (refer to the processes of the step 620 in FIG. 6 and the step 710 in FIG. 7) when the stop of the stopped state maintaining control is requested during the execution of the stopped state maintaining control (refer to the determinations "Yes" at the steps 605 and 601 in FIG. 6) while the shift lever (21) is set at any of the parking and neutral ranges (refer to the determination "Yes" at the step 615 in FIG. 6).

Even when the continuous braking is stopped while the shift lever is set at any of the parking and neutral ranges, the possibility that the vehicle is suddenly accelerated deriving from an operation of an acceleration pedal, is extremely small. Thus, it is preferred to permit the stop of the continuous braking in order to accomplish the request of the person who requests the stop of the stopped state maintaining control. The first invention apparatus permits the stop of the continuous braking when the stop of the stopped state maintaining control is requested while the shift lever is set at any of the parking and neutral ranges. Thus, the request of the person who requests the stop of the stopped state maintaining control, can be accomplished.

Similar to the first invention apparatus, a vehicle traveling control apparatus according to another invention (hereinafter, will be referred to as "the second invention apparatus") is applied to a vehicle comprising a shift lever (21), drive wheels, a driving force supplying device (32) and a braking force applying device (41, 42, 51). The driving force supplying device (32) supplies, to the drive wheels, a driving force for traveling the vehicle. The braking force applying device (41, 42, 51) applies, to the vehicle, a braking force for braking the vehicle.

The second invention apparatus comprises an electric control unit (10, 30, 40, 50). Similar to the electric control unit (10, 30, 40, 50) of the first invention apparatus, the electric control unit (10, 30, 40, 50) of the second invention apparatus is configured to continuously determine whether or not a driver of the vehicle is under an abnormal state that the driver loses an ability of driving the vehicle (refer to the processes of the step 315 in FIG. 3, the step 410 in FIG. 4 and the step 515 in FIG. 5). The electric control unit (10, 30, 40, 50) is further configured to execute a stopped state maintaining control for stopping the vehicle by causing the braking force applying device (41, 42, 51) to apply the braking force to the vehicle (refer to the process of the step 525 in FIG. 5) after the electric control unit (10, 30, 40, 50) determines that the driver is under the abnormal state (refer to the determinations "Yes" at the step 315 in FIG. 3, the step 410 in FIG. 4 and the step 515 in FIG. 5).

Further, the electric control unit (10, 30, 40, 50) is configured to perform a driving force limiting for limiting a supply request driving force (TQdreq) requested for the driving force supplying device (32) to supply to the drive wheels on the basis of a driver request driving force (TQd) requested by the driver to a value equal to or smaller than a predetermined driving force (TQth) smaller than the driver request driving force (TQd) and execute a stopped state maintaining control for maintaining the vehicle at a stopped state by performing a continuous braking for continuously applying the braking force to the vehicle from the braking force applying device (41, 42, 51) (refer to the process of the step 540 in FIG. 5) when the electric control unit (10, 30, 40, 50) stops the vehicle by the vehicle stop control (refer to the determination "No" at the step 510 in FIG. 5).

In addition, the electric control unit (10, 30, 40, 50) of the second invention apparatus is further configured to permit a stop of the stopped state maintaining control (refer to the processes of the step 620 in FIG. 6 and the step 710 in FIG. 7) when the stop of the stopped state maintaining control is requested during an execution of the stopped state maintaining control (refer to the determinations "Yes" at the steps 605 and 610 in FIG. 6) while a shift lever (21) is set at any of a parking range and a neutral range (refer to the determination "Yes" at the step 615 in FIG. 6).

As described above, even when the stopped state maintaining control is stopped while the shift lever is set at any of the parking and neutral ranges, the possibility that the vehicle is suddenly accelerated deriving from the operation of the acceleration pedal, is extremely small. Thus, it is preferred to permit the stop of the stopped state maintaining control in order to accomplish the request of the person who requests the stop of the stopped state maintaining control. The second invention apparatus permits the stop of the stopped state maintaining control when the stop of the stopped state maintaining control is requested while the shift lever is set at any of the parking and neutral ranges. Thus, the request of the person who requests the stop of the stopped state maintaining control, can be accomplished.

In the second invention apparatus, the electric control unit (10, 30, 40, 50) may be further configured to forbid the stop of the stopped state maintaining control (refer to the processes of the step 632 in FIG. 6 and the step 810 in FIG. 8) when the stop of the stopped state maintaining control is requested during the execution of the stopped state maintaining control (refer to the determinations "Yes" at the steps 605 and 610 in FIG. 6) while the shift lever (21) is set at a range other than the parking and neutral ranges (refer to the determinations "No" at the steps 615 and 630 in FIG. 6).

As described above, when the stopped state maintaining control is stopped while the shift lever is set at the range other than the parking and neutral ranges, the vehicle may be suddenly accelerated deriving from the operation of the acceleration pedal. The second invention apparatus continues the stopped state maintaining control by forbidding the stop of the stopped state maintaining control when the stop of the stopped state maintaining control is requested while the shift lever is set at the range other than the parking and neutral ranges. Thus, even when the stop of the stopped state maintaining control is mistakenly requested, the vehicle can be prevented from being suddenly accelerated.

In the second invention apparatus, the electric control unit (10, 30, 40, 50) may be further configured to permit the stop of the stopped state maintaining control (refer to the processes of the step 620 in FIG. 6 and the step 710 in FIG. 7) when a predetermined threshold time (T4*th*) elapses from a time when the electric control unit (10, 30, 40, 50) forbids the stop of the stopped state maintaining control (refer to the determination "Yes" at the step 630 in FIG. 6).

As described above, when a certain time elapses from the time when the stop of the stopped state maintaining control is requested, the possibility that the rescue of the driver under the abnormal state is completed, is large. In this case, even when the stop of the stopped state maintaining control is permitted, the possibility that the vehicle is suddenly accelerated, is small. Thus, it is preferred to permit the stop of the stopped state maintaining control in order to accomplish the request of the person who requests the stop of the stopped state maintaining control. The second invention apparatus permits the stop of the stopped state maintaining control when a certain time (i.e., the predetermined threshold time) elapses from the time when the second invention apparatus forbids the stop of the stopped state maintaining control, that is, when the certain time (i.e., the predetermined threshold time) elapses from the time when the stop of the stopped state maintaining control is requested. Thus, the request of the person who requests the stop of the stopped state maintaining control, can be accomplished.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, with reference to the drawings, a vehicle traveling control apparatus (or a vehicle driving assist apparatus) according to an embodiment of the invention will be described.

Figure 1:
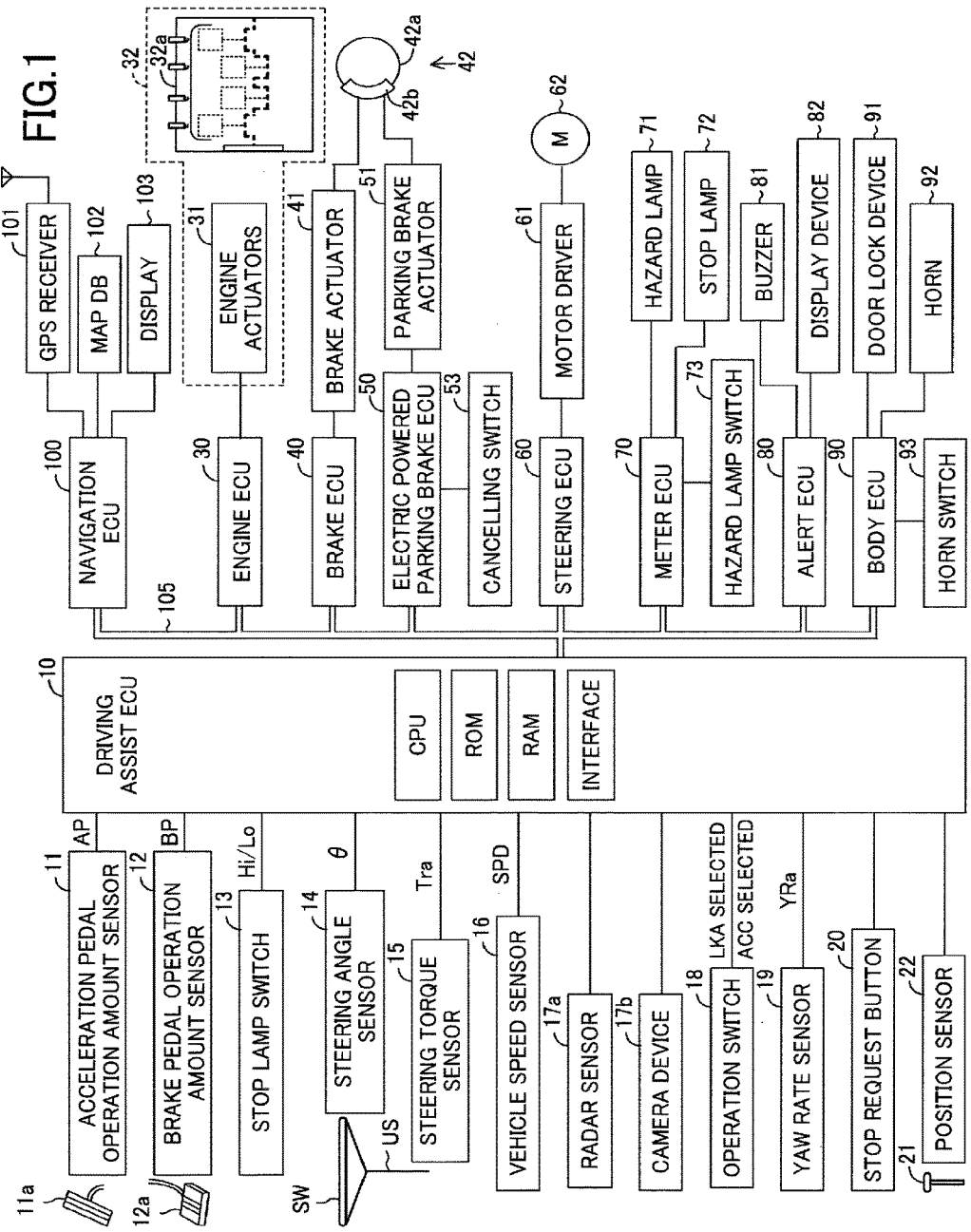
FIG. 1 is a view for showing a general configuration of a vehicle traveling control apparatus according to an embodiment of the invention.

The vehicle traveling control apparatus according to the embodiment of the invention (hereinafter, will be referred to as "the embodiment apparatus") is applied to a vehicle. Hereinafter, the vehicle will be referred to as "the own vehicle" in order to distinguish the vehicle, to which the embodiment apparatus is applied, from the other vehicles. As shown in FIG. 1, the embodiment apparatus includes a driving assist ECU 10, an engine ECU 30, a brake ECU 40, an electric powered parking brake ECU 50, a steering ECU 60, a meter ECU 70, an alert ECU 80, a body ECU 90 and a navigation ECU 100.

Each of the ECUs is an electric control unit including a microcomputer as a main part and the ECUs are connected to each other via a CAN (Controller Area Network) 105 such that the ECUs send and receive data to and from each other. In this description, the microcomputer includes a CPU, a ROM (a non-volatile memory), a RAM, an interface and the like. The CPU realizes various functions by executing instructions or programs or routines stored in the ROM. Some of the ECUs or all of the ECUs may be integrated to a single ECU.

The driving assist ECU 10 is electrically connected to sensors including switches described later and receives detection signals or output signals of the sensors, respectively. The sensors may be electrically connected to any of the ECUs other than the driving assist ECU 10. In this case, the driving assist ECU 10 receives the detection signals or the output signals of the sensors from the ECUs electrically connected to the sensors via the CAN 105.

An acceleration pedal operation amount sensor 11 detects an operation amount AP of an acceleration pedal 11*a* of the own vehicle and outputs a detection signal or an output signal representing the operation amount AP to the driving assist ECU 10. Hereinafter, the operation amount AP will be referred to as "the acceleration pedal operation amount AP".

A brake pedal operation amount sensor 12 detects an operation amount BP of a brake pedal 12*a* of the own vehicle and outputs a detection signal or an output signal representing the operation amount BP to the driving assist ECU 10. Hereinafter, the operation amount BP will be referred to as "the brake pedal operation amount BP".

A stop lamp switch 13 outputs a low-level output signal to the driving assist ECU 10 when the brake pedal 12*a* is not depressed, that is, when the brake pedal 12*a* is not operated. On the other hand, the stop lamp switch 13 outputs a high-level output signal to the driving assist ECU 10 when the brake pedal 12*a* is depressed, that is, when the brake pedal 12*a* is operated.

A steering angle sensor 14 detects a steering angle θ of the own vehicle and outputs a detection signal or an output signal representing the steering angle θ to the driving assist ECU 10. A steering torque sensor 15 detects a steering torque Tra applied to a steering shaft US of the own vehicle by an operation of a steering wheel SW and outputs a detection signal or an output signal representing the steering torque Tra to the driving assist ECU 10. A vehicle speed sensor 16 detects a traveling speed SPD of the own vehicle and outputs a detection signal or an output signal representing the traveling speed SPD to the driving assist ECU 10. Hereinafter, the traveling speed SPD will be described as to "the vehicle speed SPD".

A radar sensor 17a acquires information on a road in front of the own vehicle and three dimensional objects on the road. The three-dimensional objects include, for example, moving objects such as pedestrians, bicycles, vehicles and the like and motionless objects such as power poles, trees, guardrails and the like. Hereinafter, these three-dimensional objects will be referred to as "the target object".

The radar sensor 17a includes a radar transmitting/receiving part (not shown) and a signal processing part (not shown). The radar transmitting/receiving part transmits radio waves each having a millimeter wave band to an area surrounding the own vehicle including an area in front of the own vehicle and receives the radio waves reflected by the target objects existing within a radiation range. Hereinafter, the radio wave having the millimeter wave band will be referred to as "the millimeter wave" and the radio wave reflected by the target object will be referred to as "the reflected wave". The signal processing part acquires an inter-vehicle distance (i.e. a longitudinal distance), a relative vehicle speed, a lateral distance, a relative lateral vehicle speed and the like each time a predetermined time elapses on the basis of a phase difference between the transmitted millimeter wave and the received reflected wave, a damping level of the received reflected wave with respect to the transmitted millimeter wave, a time from a transmission of the millimeter wave to a reception of the reflected wave and the like.

A camera device 17b includes a stereo camera (now shown) and an image processing part (not shown). The stereo camera takes a pair of right and left images of landscapes at a right side of the own vehicle in front of the own vehicle and at a left side of the own vehicle in front of the own vehicle. The stereo camera acquires image data from the images of the landscapes at the right and left sides of the own vehicle. The image processing part determines whether or not the target object exists and calculates a relationship between the target object and the own vehicle and the like to output them on the basis of the image data of the images of the landscapes at the right and left sides of the own vehicle taken by the stereo camera.

The driving assist ECU 10 determines the relationship between the own vehicle and the target object, that is, determines target object information on the target object by combining the relationship between the own vehicle and the target object acquired by the radar sensor 17a and the relationship between the own vehicle and the target object acquired by the camera device 17b. Further, the driving assist ECU 10 realizes lane markers such as right and left lane lines provided on the road on the basis of the image data of the images of the landscapes at the right and left sides of the own vehicle taken by the camera device 17b and acquires a shape of the road such as a curvature radius of the road representing a degree of a curvature of the road, a positional relationship between the road and the own vehicle and the like. In addition, the driving assist ECU 10 acquires information on whether or not a road side wall exists on the basis of the image data acquired by the camera device 17b.

An operation switch 18 is operated by a driver of the own vehicle. The driver can control an execution of a lane keeping assist control (LKA) described later by operating the operation switch 18. Further, the driver can control an execution of a following-travel inter-vehicle-distance control such as an adaptive cruise control (ACC) described later by operating the operation switch 18.

A yaw rate sensor 19 detects a yaw rate YRa of the own vehicle and outputs a detection signal or an output signal representing the yaw rate YRa to the driving assist ECU 10.

A stop request button 20 is provided at a position which the driver can operates. When the stop request button 20 is not operated, the stop request button 20 outputs a low-level output signal to the driving assist ECU 10. On the other hand, when the stop request button 20 is operated, the stop request button 20 outputs a high-level output signal to the driving assist ECU 10.

A shift lever 21 can be set at any of a forward traveling range, a rearward traveling range, a neutral range and a parking range. Hereinafter, the forward traveling range will be referred to as "the D range", the rearward traveling range will be referred to as "the R range", the neutral range will be referred to as "the N range" and the parking range will be referred to as "the P range".

A position sensor 22 is electrically connected to the shift lever 21. The position sensor 22 detects a range, at which the shift lever 21 is set, i.e., a set position of the shift lever 21 and outputs a detection signal or an output signal representing the set position of the shift lever 21 to the driving assist ECU 10. The driving assist ECU 10 acquires the set position of the shift lever 21 on the basis of the detection signal output from the position sensor 22.

When the shift lever 21 is set at the D range, the driving assist ECU 10 controls a transmission (not shown) of the own vehicle such that a torque output from an internal combustion engine 32 is supplied to drive wheels (not shown) of the own vehicle as a driving force for traveling the own vehicle forward. In this case, when the acceleration pedal 11a is operated, the torque is supplied from the engine 32 to the drive wheels and as a result, the own vehicle travels forward. Hereinafter, the torque output from the engine 32 will be referred to as "the engine torque".

When the shift lever 21 is set at the R range, the driving assist ECU 10 controls the transmission such that the engine torque is supplied to the drive wheels as the driving force for traveling the own vehicle rearward. In this case, when the acceleration pedal 11a is operated, the engine torque is supplied to the drive wheel and as a result, the vehicle travels rearward.

When the shift lever 21 is set at the N range, the driving assist ECU 10 controls the transmission such that the engine torque is not supplied to the drive wheels. In this case, even when the acceleration pedal 11a is operated, the engine torque is not supplied to the drive wheels and as a result, the own vehicle does not travel.

When the shift lever 21 is set at the P range, the driving assist ECU 10 controls the transmission such that the engine torque is not supplied to the drive wheels and activates a parking lock mechanism (not shown) provided in a transaxle (not shown) to brake the drive wheels. In this case, even when the acceleration pedal 11a is operated, the engine torque is not supplied to the drive wheels and the drive wheels are braked by the parking lock mechanism such that the drive wheels does not rotate. Thereby, the own vehicle is maintained at a stopped state.

The engine ECU 30 is electrically connected to engine actuators 31 of the engine 32. The engine actuators 31 change operation states of a body 32a of the engine 32, respectively. In this embodiment, the engine 32 is a gasoline-fuel-injection spark-ignition type multi-cylinder internal combustion engine and includes a throttle valve (not shown) for adjusting an amount of air flowing into combustion chambers (not shown) of the engine 32. The engine actuators 31 include at least a throttle valve actuator (not shown) for changing an opening degree of the throttle valve.

The engine ECU 30 can change the engine torque generated by the engine 32 by controlling activations of the engine actuators 31. The engine torque generated by the engine 32 is transmitted to the drive wheels through the transmission. Therefore, the engine ECU 30 can change an acceleration or an acceleration state by controlling the driving force supplied to the own vehicle, in particular, to the drive wheels by controlling the activations of the engine actuators 31.

The brake ECU 40 is electrically connected to a brake actuator 41. The brake actuator 41 is provided in a hydraulic circuit provided between a master cylinder (not shown) for pressurizing hydraulic oil by a depression force of the brake pedal 12a and a friction brake mechanism provided in right and left front and rear wheels of the own vehicle. The friction brake mechanism 42 includes brake discs 42a each secured to the corresponding wheel of the own vehicle and brake calipers 42b secured to the body of the own vehicle at the corresponding wheel The brake actuator 41 adjusts a hydraulic pressure supplied to a wheel cylinder (not shown) in each of the brake caliper 42b, depending on a command sent from the brake ECU 40 to activate the wheel cylinder by the hydraulic pressure to press a brake pad (not shown) on the brake disc 42a, thereby to generate a friction braking force on the brake disc 42a. Therefore, the brake ECU 40 can control an activation of the brake actuator 41 to control a braking force applied to the own vehicle, in particular, to the wheels. Hereinafter, a braking of the own vehicle by controlling the activation of the brake actuator 41 will be referred to as "the hydraulic braking performed by the friction brake mechanism 42" or simply as "the hydraulic braking".

The electric powered parking brake ECU 50 is electrically connected to a parking brake actuator 51. The parking brake actuator 51 generates the friction braking force by pressing the brake pad on the brake disc 42a. Alternatively, when the own vehicle includes drum brakes in the wheels of the own vehicle, respectively, the parking brake actuator 51 generates the friction braking force by pressing a shoe on a drum which rotates together with the corresponding wheel. Therefore, the electric powered parking brake ECU 50 can apply the friction braking force to the wheels by activating the parking brake actuator 51. Hereinafter, the braking of the own vehicle by activating the parking brake actuator 51 will be referred to as "the EPB braking".

A canceling switch 53 is electrically connected to the electric powered parking brake ECU 50. When the cancelling switch 53 is operated, a stop of the EPB braking is requested to the electric powered parking brake ECU 50.

The steering ECU 60 is a control device of a known electric powered steering system and is electrically connected to a motor driver 61. The motor driver 61 is electrically connected to a steering motor 62. The steering motor 62 is assembled in a steering mechanism (not shown) of the own vehicle including the steering wheel SW, the steering shaft US connected to the steering wheel SW, a steering gear mechanism (not shown) and the like. The steering motor 62 generates a torque by an electric power supplied from the motor driver 61 and uses the torque to apply a steering assist torque to the steering shaft US to steer the right and left steered wheels.

The meter ECU 70 is electrically connected to a digital display meter (not shown), a hazard lamp 71 and a stop lamp 72. The meter ECU 70 blinks the hazard lamp 71 and lights the stop lamp 72, depending on a command sent from the driving assist ECU 10.

The meter ECU 70 is electrically connected to a hazard lamp switch 73. When the hazard lamp switch 73 is operated while the hazard lamp 71 does not blink, the driving assist ECU 10 requests the meter ECU 70 to blink the hazard lamp 71. On the other hand, when the hazard lamp switch 73 is operated while the hazard lamp 71 blinks, the driving assist ECU 10 requests the meter ECU 70 to stop a blinking of the hazard lamp 71.

The alert ECU 80 is electrically connected to a buzzer 81 and a display device 82. The alert ECU 80 can perform an attention to the driver by causing the buzzer 81 to generate sounds, depending on a command sent from the driving assist ECU 10. In addition, the alert ECU 80 can cause the display device 82 to light an attention mark such as a warning lamp and/or display an attention message and an operation state of a driving assist control. Hereinafter, a generation of the sounds performed by the buzzer 81, a lighting of the attention mark performed by the display device 82 and the like will be referred to as "the non-driving-operation alert".

The body ECU 90 is electrically connected to a door lock device 91 and a horn 92. The body ECU 90 causes the door lock device 91 to release a lock of doors (not shown) of the own vehicle, depending on a command sent from the driving assist ECU 10. Further, the body ECU 90 causes the horn 92 to generate sounds, depending on a command sent from the driving assist ECU 10.

The body ECU 90 is electrically connected to a horn switch 93. When the horn switch 93 is operated while the horn 92 generates the sounds, a stop of a sound generation performed by the horn 92 is requested to the body ECU 90.

The navigation ECU 100 is electrically connected to a GPS receiver 101 which receives a GPS detection signal for detecting a present position of the own vehicle, a map database 102 which stores a map information and the like, a touch-screen type display 103 which is a human-machine interface and the like. The navigation ECU 100 identifies the present position of the own vehicle on the basis of the GPS detection signal, performs various calculations on the basis of the present position of the own vehicle and the map information and the like stored in the map database 102 and performs a route guidance using the display 103.

The map information stored in the map database 102 includes road information. The road information includes parameters which show a road shape of each of segments of the road such as a road curvature radius or a road curvature which shows a degree of a curve of the road. The curvature corresponds to an inverse number of the curvature radius.

<Summary of Operation of Embodiment Apparatus>

Next, a summary of an operation of the embodiment apparatus will be described. The driving assist ECU 10 of the embodiment apparatus is configured or programmed to execute the lane keeping control (LKA) and the following-travel inter-vehicle-distance control (ACC). Further, the driving assist ECU 10 determines whether or not the driver is under an abnormal state which the driver loses his/her ability of driving the own vehicle repeatedly when the lane keeping control and the following-travel inter-vehicle-distance control are executed. Hereinafter, the abnormal state which the driver loses his/her ability of driving the own vehicle will be simply referred to as "the abnormal state". When the driver continues to be under the abnormal state at an elapse of a predetermined time from a time of first determining that the driver is under the abnormal state, the driving assist ECU 10 decelerates the own vehicle to stop the own vehicle.

Next, a summary of a process for stopping the own vehicle when the driver continues to be under the abnormal state will be described. In this regard, a determination of whether or not the driver is under the abnormal state is performed when a condition that the lane keeping control and the following-travel inter-vehicle-distance control are executed, is satisfied. Accordingly, the lane keeping control and the following-travel inter-vehicle-distance control will be described first.

<Lane Keeping Assist Control (LKA)>

The lane keeping control is a control for assisting a steering operation of the driver by applying the steering torque to the steering mechanism to keep the position of the own vehicle along a target traveling line within a lane, in which the own vehicle travels. Hereinafter, the lane, in which the own vehicle travels, will be referred to as "the traveling lane". The lane keeping control is known (for example, refer to JP 2008-195402 A, JP 2009-190464 A, JP 2010-6279 A and JP 4349210 B). Therefore, below, the lane keeping control will be briefly described.

The driving assist ECU 10 identifies or acquire the right and left lane lines LR and LL of the traveling lane, on which the own vehicle travels, on the basis of the image data sent from the camera device 17b and determines a center position between the right and left lane lines LR and LL as a target traveling line Ld. Further, the driving assist ECU 10 calculates a curve radius, i.e., a curvature radius R of the target traveling line Ld and the position and a direction of the own vehicle in the traveling lane which is defined by the right and left lane lines LR and LL.

Then, the driving assist ECU 10 calculates a distance Dc between a front center position of the own vehicle and the target traveling line Ld in a lateral direction or width direction of the road and a difference angle θy between the target traveling line Ld and a traveling direction of the own vehicle. Hereinafter, the distance Dc will be referred to as "the center distance Dc" and the difference angle θy will be referred to as "the yaw angle θy".

Further, the driving assist ECU 10 calculates a target yaw rate YRctgt at a predetermined calculation cycle on the basis of the center distance Dc, the yaw angle θy and the road curvature ν (=1/R) in accordance with a following expression (1). In the expression (1), K1, K2 and K3 are control gains. The target yaw rate YRctgt is a yaw rate which is set to cause the own vehicle to travel along the target traveling line Ld.

$$YRctgt = K1 \times Dc + K2 \times \theta y + K3 \times \nu \quad (1)$$

The driving assist ECU 10 calculates a target steering torque Trtgt for accomplishing the target yaw rate YRctgt at a predetermined calculation cycle on the basis of the target yaw rate YRctgt and the actual yaw rate YRa.

In particular, the driving assist ECU 10 previously stores a look-up table which defines a relationship between the target steering torque Trtgt and a difference between the target yaw rate YRctgt and the actual yaw rate YRa. The driving assist ECU 10 calculates the target steering torque Trtgt by applying the difference between the target yaw rate YRctgt and the yaw rate YRa to the look-up table. Then, the driving assist ECU 10 controls the steering motor 62 by using the steering ECU 60 such that the actual steering torque Tra corresponds to the target steering torque Trtgt. The summary of the lane keeping control has been described.

<Following-Travel Inter-Vehicle-Distance Control (ACC)>

The following-travel inter-vehicle-distance control is a control for causing the own vehicle to travel following a preceding vehicle which travels in front of the own vehicle while maintaining an inter-vehicle distance between the preceding vehicle and the own vehicle at a predetermined distance. The following-travel inter-vehicle-distance control is known (for example, JP 2014-148293 A, JP 2006-315491 A, JP 4172434 B and JP 4929777 B). Therefore, below, the following-travel inter-vehicle-distance control will be briefly described.

The driving assist ECU 10 executes the following-travel inter-vehicle-distance control when an execution of the following-travel inter-vehicle-distance control is requested by an operation of the operation switch 18.

In particular, the driving assist ECU 10 selects a vehicle, which the own vehicle should follow, on the basis of the target object information acquired by a surrounding sensor including the radar sensor 17a and the camera device 17b when the execution of the following-travel inter-vehicle-distance control is requested. The vehicle which the own vehicle should follow will be referred to as "the target vehicle". For example, the driving assist ECU 10 determines whether or not a relative position of the target object (n) is within a target vehicle area. The relative position of the target object (n) is determined on the basis of the lateral distance Dfy(n) of the detected target object (n) and the inter-vehicle distance Dfx(n). The target vehicle area is an area previously determined such that the lateral distance Dfy(n) decreases as the inter-vehicle distance Dfx(n) increases. Then, when the relative position of the target object (n) is within the target vehicle area for a time equal to or longer than a predetermined time, the driving assist ECU 10 selects the target object (n) as the target vehicle (a).

Further, the driving assist ECU 10 calculates a target acceleration Gtgt in according with any of following expressions (2) and (3). In the expressions (2) and (3), Vfx(a) is a relative vehicle speed of the target vehicle (a) with respect to the own vehicle, k1 and k2 are predetermined positive gains or coefficients and ΔD1 is an inter-vehicle distance difference obtained by subtracting a target inter-vehicle distance Dtgt from the inter-vehicle distance Dfx(a) of the target vehicle (a) (ΔD1=Dfx(a)−Dtgt). The target inter-vehicle distance Dtgt is calculated by multiplying a target inter-vehicle time Ttgt by the vehicle speed SPD of the own vehicle (Dtgt=Ttgt×SPD). The target inter-vehicle time Ttgt is set by the driver using the operation switch 18.

The driving assist ECU 10 determines the target acceleration Gtgt in accordance with the following expression (2) when the value (k1×ΔD1+k2×Vfx(a)) is positive or zero. In the expression (2), ka1 is a positive gain or coefficient for accelerating the own vehicle and is set to a value equal to or smaller than "1".

$$Gtgt \text{(for acceleration)} = ka1 \times (k1 \times \Delta D1 + k2 \times Vfx(a)) \quad (2)$$

On the other hand, when the value (k1×ΔD1+k2×Vfx(a)) is negative, the driving assist ECU 10 determines the target acceleration Gtgt in accordance with the following expression (3). In the expression (3), kd1 is a gain or coefficient for decelerating the own vehicle and in this embodiment, is set to "1".

$$Gtgt(\text{for deceleration}) = kd1 \times (k1 \times \Delta D1 + k2 \times Vfx(a)) \quad (3)$$

When the target vehicle does not exist within the target vehicle area, the driving assist ECU 10 determines the target acceleration Gtgt on the basis of the vehicle speed SPD of the own vehicle and a target vehicle speed SPDtgt such that the vehicle speed SPD of the own vehicle corresponds to the target vehicle speed SPDtgt which is set depending on the target inter-vehicle time Ttgt.

The driving assist ECU 10 controls the engine actuators 31 by using the engine ECU 30 and if necessary, controls the brake actuator 41 by using the brake ECU 40 such that an acceleration of the own vehicle corresponds to the target acceleration Gtgt. The summary of the following-travel inter-vehicle-distance control has been described.

<Process for Stopping Vehicle>

Figure 2:
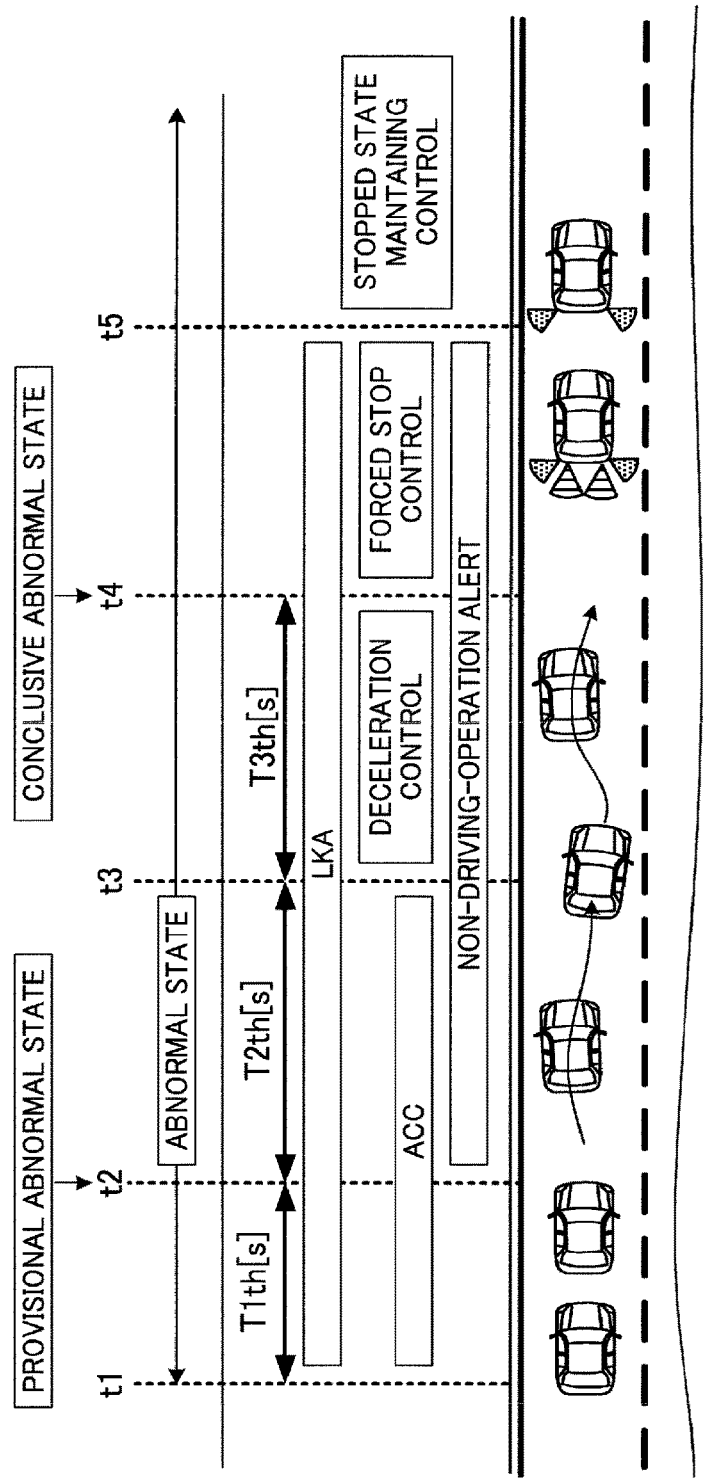
FIG. 2 is a view used for describing an operation of the vehicle traveling control apparatus shown in FIG. 1.

The driving assist ECU 10 provisionally determines that the driver is under the abnormal state at a time t2 in FIG. 2 when the driving assist ECU 10 has determined that driver is under the abnormal state for a predetermined time T1*th* from a time t1 in FIG. 2 when the driving assist ECU 10 first determines that the driver is under the abnormal state. Hereinafter, the predetermined time T1*th* will be referred to as "the first threshold time T1*th*" and the abnormal state which is provisionally determined will be referred to as "the provisional abnormal state". When the driving assist ECU 10 first determines that the driver is under the provisional abnormal state, the driving assist ECU 10 changes a driver's state from a normal state, which has been set, to the provisional abnormal state. In this case, the driving assist ECU 10 performs an alerting for prompting the driver to perform driving operations.

When the driving assist ECU 10 determines that the driver is still under the abnormal state at a time t3 in FIG. 2 when a predetermined time T2*th* elapses from the time t2 when the driver's state is changed from the normal state to the provisional abnormal state, the driving assist ECU 10 stops the following-travel inter-vehicle-distance control and starts a deceleration control for activating the brake actuator 41 to decrease the vehicle speed SPD of the own vehicle at a predetermined first constant deceleration α1. At this time, the driving assist ECU 10 continues the lane keeping control. Hereinafter, the predetermined time T2*th* will be referred to as "the second threshold time T2*th*".

When the driver knows the alerting and/or the deceleration of the own vehicle and performs the driving operations, the driving assist ECU 10 detects the driver's driving operation and returns the driver's state from the provisional abnormal state to the normal state. In this case, the driving assist ECU 10 stops the alerting for the driver which has been performed and the deceleration control which have been executed. At this time, the driving assist ECU 10 continues the lane keeping control and restart the following-travel inter-vehicle-distance control.

On the other hand, after the driving assist ECU 10 starts the deceleration control, the driver does not perform any driving operations and then, when a predetermined time T3*th* elapses at a time t4 in FIG. 2 from the time t3 when the deceleration control starts, a possibility that the driver is under the abnormal state, is large. In this case, the driving assist ECU 10 changes the driver's state from the provisional abnormal state to a conclusive abnormal state. Hereinafter, the predetermined time T3*th* will be referred to as "the third threshold time T3*th*".

Further, the driving assist ECU 10 forbids the acceleration including the deceleration of the own vehicle derived from a change of the acceleration pedal operation amount AP, that is, forbids an acceleration pedal operation overriding. In other words, the driving assist ECU 10 cancels or ignores a driving state changing request or an acceleration request derived from an operation of the acceleration pedal 11*a* as far as the driving operation of the driver is not detected.

Therefore, even when the engine torque TQd, which the driver requests as a torque to be supplied from the engine 32 to the drive wheels of the own vehicle, is larger than zero while the driving assist ECU 10 forbids the acceleration pedal operation overriding, the driving assist ECU 10 sets a torque TQdreq, which the driving assist ECU 10 requests the engine 32 to output deriving from the engine torque TQd, to zero.

In this case, the driving assist ECU 10 sets a torque TQreq, which the driving assist ECU 10 actually requests the engine 32 to output, to a minimum engine torque necessary to maintain an operation of the engine 32. That is, the driving assist ECU 10 sets the torque TQreq to an idling torque. In this case, the engine ECU 30 activates the engine actuators 31 such that the engine 32 outputs a torque corresponding to the torque TQreq. Thereby, a torque corresponding to the idling torque is supplied to the drive wheels of the own vehicle. Hereinafter, the acceleration pedal operation overriding will be referred to as "the AOR", the engine torque TQd will be referred to as "the driver's request torque TQd", the torque TQdreq will be referred to as "the supply request torque TQdreq" and the torque TQreq will be referred to as "the actual request torque TQreq".

It should be noted that the driving assist ECU 10 acquires the driver request torque TQd on the basis of the acceleration pedal operation amount AP. In this case, the acquired driver request torque TQd increases as the acceleration pedal operation amount AP increases.

In addition to a setting of the actual request torque TQreq, the driving assist ECU 10 activates the brake actuator 41 to decelerate the own vehicle at a predetermined second constant deceleration α2 larger than the predetermined first constant deceleration α1, thereby to forcibly stop the own vehicle.

Hereinafter, a control for forcibly stopping the own vehicle by forbidding the AOR and decelerating the own vehicle at the predetermined second constant deceleration α2 when the driver's state is set to the conclusive abnormal state, will be also referred to as "the vehicle stop control".

<Stopped State Maintaining Control>

The driving assist ECU 10 continues to forbid the AOR, starts a stopped state maintaining control for performing the EPB braking and stops the hydraulic braking performed by the friction brake mechanism 42 at a time t5 in FIG. 2 when the driving assist ECU 10 forcibly stops the own vehicle by the vehicle stop control. Thereby, after the own vehicle stops, the own vehicle is maintained at a stopped state.

Further, at a time when forcibly stopping the own vehicle by the vehicle stop control, the driving assist ECU 10 forbids a stop of the blinking of the hazard lamp 71 and a stop of the sound generation performed by the horn 92. Thereby, after the own vehicle stops, the hazard lamp 71 continues to blink and the horn 92 continues to generate the sounds.

<Permission of Stop of Stopped State Maintaining Control>

After the own vehicle stops, a rescuer who rescues the driver under the abnormal state, may mistakenly operate the stop request button 20. In this case, a stop of the stopped state maintaining control is mistakenly requested. At this time, if the driving assist ECU 10 permits the stop of the stopped state maintaining control and the driver is operating the acceleration pedal 11a, the own vehicle may be suddenly accelerated while the rescuer rescues the driver.

Accordingly, the driving assist ECU 10 continues the stopped state maintaining control when the stop of the stopped state maintaining control is requested deriving from the operation of the stop request button 20 during the execution of the stopped state maintaining control and the shift lever 21 is set at a range other than the P and N ranges, that is, at the D or R range. In particular, the driving assist ECU 10 continues to forbid the AOR and perform the EPB braking. In other words, the driving assist ECU 10 forbids a permission of the AOR as well as a permission of a stop of the EPB.

With this configuration of the embodiment apparatus, the AOR continues to be forbidden. Thereby, even when the driver is operating the acceleration pedal 11a, the own vehicle can be prevented from being suddenly accelerated. In addition, the EPB braking continues and thus, the own vehicle can be prevented from being suddenly accelerated.

When a predetermined time T4th elapses after the stop request button 20 is operated during the execution of the stopped state maintaining control, the driving assist ECU 10 permits the AOR and the stop of the EPB braking. Hereinafter, the predetermined time T4th will be referred to as "the fourth threshold time T4th".

When the AOR is permitted, the driver request torque TQd acquired on the basis of the acceleration pedal operation amount AP is set as the supply request torque TQdreq. Thereby, the engine actuators 31 are activated such that the engine 32 outputs a torque corresponding to the supply request torque TQdreq. In addition, with the permission of the stop of the EPB braking, when the stop of the EPB braking is requested due to the operation of the cancelling switch 53, the EPB braking is stopped.

As described above, when a constant time elapses after the stop of the stopped state maintaining control is requested, a possibility that a rescue of the driver is completed, is large. The embodiment apparatus permits the AOR and the stop of the EPB braking when the fourth threshold time T4th elapses after the stop of the stopped state maintaining control is requested deriving from the operation of the stop request button 20 during the execution of the stopped state maintaining control. Thereby, a request of a person, who operates the stop request button 20 to request the stop of the stopped state maintaining control, can be accomplished.

Further, the driving assist ECU 10 continues to forbid the stop of the blinking of the hazard lamp 71 and the stop of the sound generation performed by the horn 92 when the stop of the blinking of the hazard lamp 71 and the stop of the sound generation performed by the horn 92 are requested deriving from the operation of the stop request button 20 during the execution of the stopped state maintaining control while the shift lever 21 is set at the range other than the P and N ranges.

With the forbidding of the stop of the blinking of the hazard lamp 71, the hazard lamp 71 continues to blink even when the stop of the blinking of the hazard lamp 71 is requested deriving from the operation of the hazard lamp switch 73. In addition, with the forbidding of the stop of the sound generation performed by the horn 92, the horn 92 continues to generate the sounds even when the stop of the sound generation performed by the horn 92 is requested deriving from the operation of the horn switch 93.

Further, the driving assist ECU 10 permits the stop of the blinking of the hazard lamp 71 and the stop of the sound generation performed by the horn 92 when the fourth threshold time T4th elapses after the stop request button 20 is operated during the execution of the stopped state maintaining control.

With the permission of the stop of the blinking of the hazard lamp 71, the blinking of the hazard lamp 71 is stopped when the hazard lamp switch 73 is operated. In addition, with the permission of the stop of the sound generation performed by the horn 92, the sound generation by performed the horn 92 is stopped when the horn switch 93 is operated.

On the other hand, when the stop of the stopped state maintaining control is requested deriving from the operation of the stop request button 20 during the execution of the stopped state maintaining control while the shift lever 21 is set at any of the P and N ranges, the driving assist ECU 10 stops the stopped state maintaining control. In particular, the driving assist ECU 10 permits the AOR and the stop of the EPB braking.

When the AOR is permitted, the driver request torque TQd is set as the supply request torque TQdreq. Thereby, the engine actuators 31 are activated such that the engine 32 outputs a torque corresponding to the supply request torque TQdreq. In addition, with the permission of the stop of the EPB braking, the EPB braking is stopped when the stop of the EPB braking is requested deriving from the operation of the canceling switch 53.

When the engine 32 is requested to output a torque corresponding to the driver request torque TQd while the shift lever 21 is set at any of the P and N ranges, a possibility that the own vehicle is suddenly accelerated, is small. Thus, even when the stop request button 20 is mistakenly operated during the execution of the stopped state maintaining control, the own vehicle can be prevented from being suddenly accelerated.

Further, when the stop of the blinking of the hazard lamp 71 and the stop of the sound generation performed by the horn 92 are requested deriving from the operation of the stop request button 20 during the execution of the stopped state maintaining control while the shift lever 21 is set at any of the P and N ranges, the driving assist ECU 10 permits the stop of the blinking of the hazard lamp 71 and the stop of the sound generation performed by the horn 92.

With the permission of the stop of the blinking of the hazard lamp 71, the blinking of the hazard lamp 71 is stopped when the stop of the blinking of the hazard lamp 71 is requested deriving from the operation of the hazard lamp switch 73. In addition, with the permission of the stop of the sound generation performed by the horn 92, the sound generation performed by the horn 92 is stopped when the stop of the sound generation performed by the horn 92 is requested deriving from the operation of the horn switch 93.

The summary of the operation of the embodiment apparatus has been described. With the operation of the embodiment apparatus, even when the stop request button 20 is mistakenly operated during the execution of the stopped state maintaining control, the own vehicle can be prevented from being suddenly accelerated.

<Concrete Operation of Embodiment Apparatus>

Next, a concrete operation of the embodiment apparatus will be described. The CPU of the driving assist ECU 10 of the embodiment apparatus is configured or programmed to execute a normal state routine shown by a flowchart in FIG. 3 each time a predetermined time dT elapses.

Figure 3:
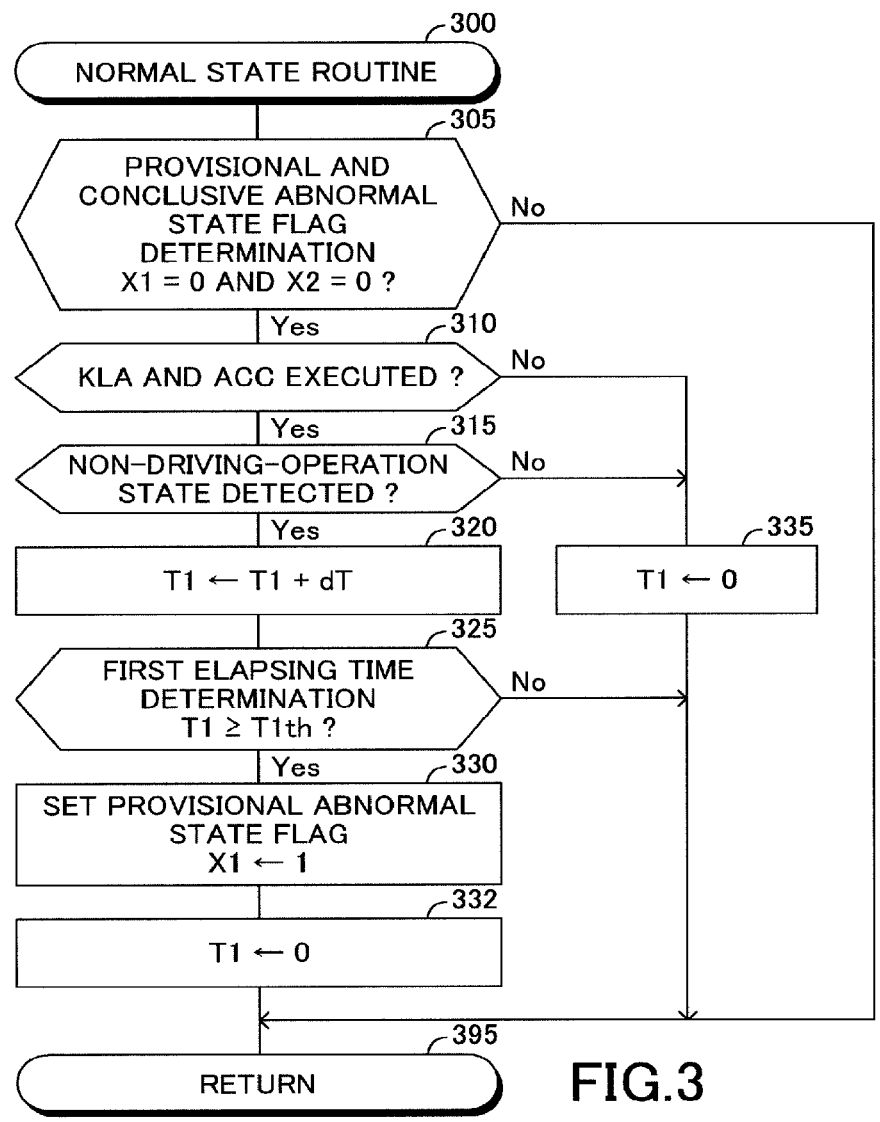
FIG. 3 is a flowchart for showing a normal state routine executed by a CPU of a driving assist ECU shown in FIG. 1.

Therefore, at a predetermined timing, the CPU starts a process of a step 300 in FIG. 3 and then, proceeds with the process to a step 305 to determine whether or not values of a provisional abnormal state flag X1 and a conclusive abnormal state flag X2 are "0".

The provisional abnormal state flag X1 indicates that the driver's state is determined as the provisional abnormal state when the value of the provisional abnormal state flag X1 is "1". The conclusive abnormal state flag X2 indicates that the driver's state is determined as the conclusive abnormal state when the value of the conclusive abnormal state flag X2 is "1". When the values of the provisional and conclusive abnormal state flags X1 and X2 are "0", the flags X1 and X2 indicate that the driver's state is determined as the normal state.

The values of the provisional and conclusive abnormal state flags X1 and X2 are initialized to be set to "0", respectively when an ignition switch (not shown) is set at an ON position.

Immediately after the ignition switch is set at the ON position, the values of the provisional and conclusive abnormal state flags X1 and X2 are "0". Thus, the CPU determines "Yes" at the step 305 and then, proceeds with the process to a step 310 to determine whether or not the lane keeping control (LKA) and the following-travel inter-vehicle-distance control (ACC) are executed.

When the lane keeping control and the following-travel inter-vehicle-distance control are executed, the CPU determines "Yes" at the step 310 and then, proceeds with the process to a step 315 to determine whether or not the non-driving-operation state that the driver does not take any driving action, is detected.

The non-driving-operation state is a state that one or more parameters such as the acceleration pedal operation amount AP, the brake pedal operation amount BP, the actual steering torque Tra and a signal level of the stop lamp switch 13 which are changed deriving from the driving operation of the driver, does/do not change. In this embodiment, the CPU determines a state that the acceleration pedal operation amount AP, the brake pedal operation amount BP and the actual steering torque Tra do not change and the actual steering torque Tra is zero as the non-driving-operation state.

When the non-driving-operation state is detected, the CPU determines "Yes" at the step 315 and then, executes a process of a step 320 described below. Then, the CPU proceeds with the process to a step 325.

Step 320: The CPU increases a time T1 elapsing from a time when the non-driving-operation state is first detected at the step 315 by a predetermined time dT. The predetermined time dT is equal to the predetermined time dT which corresponds to an execution cycle of this normal state routine. Hereinafter, the time T1 will be referred to as "the first elapsing time T1".

When the CPU proceeds with the process to the step 325, the CPU determines whether or not the first elapsing time T1 is equal to or larger than the first threshold time T1*th*. Immediately after the CPU determines "Yes" at the step 315, the first elapsing time T1 is smaller than the first threshold time T1*th*. In this case, the CPU determines "No" at the step 325 and then, proceeds with the process to a step 395 to terminate this routine once.

On the other hand, when the non-driving-operation state continues and then, the first elapsing time T1 becomes equal to or larger than the first threshold time T1*th*, the CPU determines "Yes" at the step 325 and then, sequentially executes processes of steps 330 and 332 described below. Then, the CPU proceeds with the process to the step 395 to terminate this routine once.

Step 330: The CPU sets the value of the provisional abnormal state flag X1 to "1". After the value of the provisional abnormal state flag X1 is set to "1", the CPU determines "No" at the step 305 and determines "Yes" at a step 405 in FIG. 4 described later. Therefore, in place of the normal state routine shown in FIG. 3, a provisional abnormal state routine shown in FIG. 4 substantially functions.

Step 332: The CPU clears the first elapsing time T1. The first elapsing time T1 is also cleared when the ignition switch is set at the ON position.

When any of the lane keeping control and the following-travel inter-vehicle-distance control is not executed upon an execution of the process of the step 310, the CPU determines "No" at the step 310 and then, executes a process of a step 335 described below. Also, when the non-driving-operation state is not detected upon an execution of the process of the step 315, the CPU determines "No" at the step 315 and then, executes the process of the step 335. Then, the CPU proceeds with the process to the step 395 to terminate this routine once.

Step 335: The CPU clears the first elapsing time T1.

When any of the values of the provisional and conclusive abnormal state flags X1 and X2 is "1" upon an execution of the process of the step 305, the CPU determines "No" at the step 305 and then, proceeds with the process directly to the step 395 to terminate this routine once.

Figure 4:
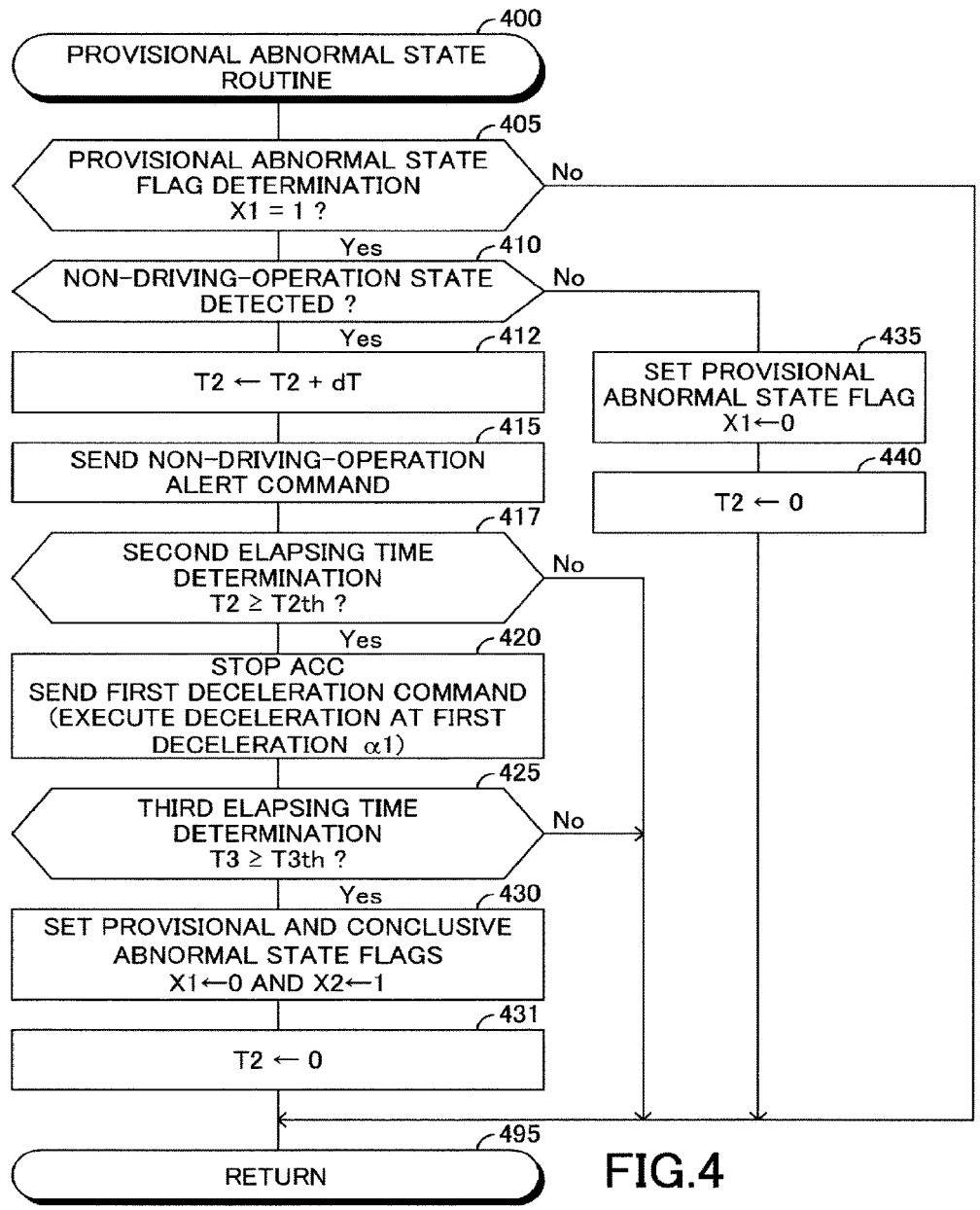
FIG. 4 is a flowchart for showing a provisional abnormal state routine executed by the CPU.

Further, the CPU is configured or programmed to execute a provisional abnormal state routine shown by a flowchart in FIG. 4 each time the predetermined time dT elapses. Therefore, at a predetermined timing, the CPU starts a process from a step 400 in FIG. 4 and then, proceeds with the process to a step 405 to determine whether or not the value of the provisional abnormal state flag X1 is "1". When the value of the provisional abnormal state flag X1 is set to "1" at the step 330 in FIG. 3, that is, when the driver's state is determined as the provisional abnormal state, the CPU determines "Yes" at the step 405 and then, proceeds with the process to a step 410.

When the CPU proceeds with the process to the step 410, the CPU determines whether or not the non-driving-operation state is detected. This determination is the same as the determination of the step 315 in FIG. 3. When the non-driving-operation state is detected, the CPU determines "Yes" at the step 410 and then, sequentially executes processes of steps 412 and 415 described below. Then, the CPU proceeds with the process to a step 417.

Step 412: The CPU increases a time T2 elapsing from a time when the driver's state is determined as the provisional abnormal state by the predetermined time dT. The predetermined time dT is equal to the predetermined time dT which corresponds to an execution cycle of this provisional abnormal routine. Hereinafter, the time T2 will be referred to as "the second elapsing time T2".

Step 415: The CPU sends a non-driving-operation alert command to the alert ECU 80. Thereby, the alert ECU 80 causes the buzzer 81 to generate alerting sounds and causes the display device 82 to blink the warning lamp and display the alerting message for prompting the driver to operate any of the acceleration pedal 11*a*, the brake pedal 12*a* and the steering wheel SW.

When the CPU proceeds with the process to the step 417, the CPU determines whether or not the second elapsing time T2 is equal to or larger than the second threshold time T2*th*. Immediately after the value of the provisional abnormal state flag X1 is set to "1" at the step 330 in FIG. 3, that is, when the driver's state is determined as the provisional abnormal state, the second elapsing time T2 is smaller than the second threshold time T2*th*. In this case, the CPU determines "No" at the step 417 and then, proceeds with the process to a step 495 to terminate this routine once.

On the other hand, when the driver's state continues to be determined as the provisional abnormal state and then, the second elapsing time T2 becomes equal to or larger than the second threshold time T2*th*, the CPU determines "Yes" at the step 417 and then, executes a process of a step 420 described below. Then, the CPU proceeds with the process to a step 425.

Step 420: The CPU stops the following-travel inter-vehicle-distance control (ACC) and sends, to the engine and brake ECUs 30 and 40, a first deceleration command for causing the engine and brake ECUs 30 and 40 to execute the deceleration control for decelerating the own vehicle at the predetermined first constant deceleration α1. In this case, the CPU calculates the acceleration of the own vehicle on the basis of a change amount per unit time of the vehicle speed SPD acquired on the basis of the detection signal sent from the vehicle speed sensor 16 and sends, to the engine and brake ECUs 30 and 40, a command for causing the calculated acceleration to correspond to the predetermined first constant deceleration α1. In this embodiment, the predetermined first constant deceleration α1 is set to a deceleration having an extremely small absolute value.

When the CPU proceeds to the process to the step 425, the CPU determines whether or not a time T3 elapsing from a time when the deceleration control is started at the step 420 is equal to or larger than the third threshold time T3*th*. The time T3 is acquired by subtracting the second threshold time T2*th* from the second elapsing time T2 (T3=T2−T2*th*). Hereinafter, the time T3 will be referred to as "the third elapsing time T3".

Immediately after the process of the step 420 is first executed, that is, immediately after the deceleration control is started, the third elapsing time T3 is smaller than the third threshold time T3*th*. In this case, the CPU determines "No" at the step 425 and then, proceeds with the process to the step 495 to terminate this routine once.

On the other hand, when the driver's state continues to be determined as the provisional abnormal state and then, the third elapsing time T3 becomes equal to or larger than the third threshold time T3*th*, the CPU determines "Yes" at the step 425 and then, sequentially executes processes of steps 430 and 431 described below. Then, the CPU proceeds with the process to the step 495 to terminate this routine once.

Step 430: The CPU sets the value of the provisional abnormal state flag X1 to "0" and sets the value of the conclusive abnormal state flag X2 to "1". Thereby, the CPU determines "No" at the step 405 and determines "Yes" at a step 505 in FIG. 5 described later. In this case, in place of the provisional abnormal state routine shown in FIG. 4, a normal state routine shown in FIG. 5 substantially functions.

Step 431: The CPU clears the second elapsing time T2. The second elapsing time T2 is also cleared when the ignition switch is set at the ON position.

When the driving operation by the driver is detected upon an execution of the process of the step 410, the CPU determines "No" at the step 410 and then, sequentially executes processes of steps 435 and 440 described below. Then, the CPU proceeds with the process to the step 495 to terminate this routine once.

Step 435: The CPU sets the value of the provisional abnormal state flag X1 to "0". Thereby, the values of the provisional and conclusive abnormal state flags X1 and X2 are set to "0", the driver's state is set to the normal state. In this case, the CPU determines "Yes" at the step 305 in FIG. 3. Thus, in place of the provisional abnormal state routine shown in FIG. 4, the normal state routine shown in FIG. 3 substantially functions.

Step 440: The CPU clears the second elapsing time T2.

Further, when the value of the provisional abnormal state flag X1 is "0" upon an execution of the process of the step 405, the CPU determines "No" at the step 405 and then, proceeds with the process directly to the step 495 to terminate this routine once.

Figure 5:
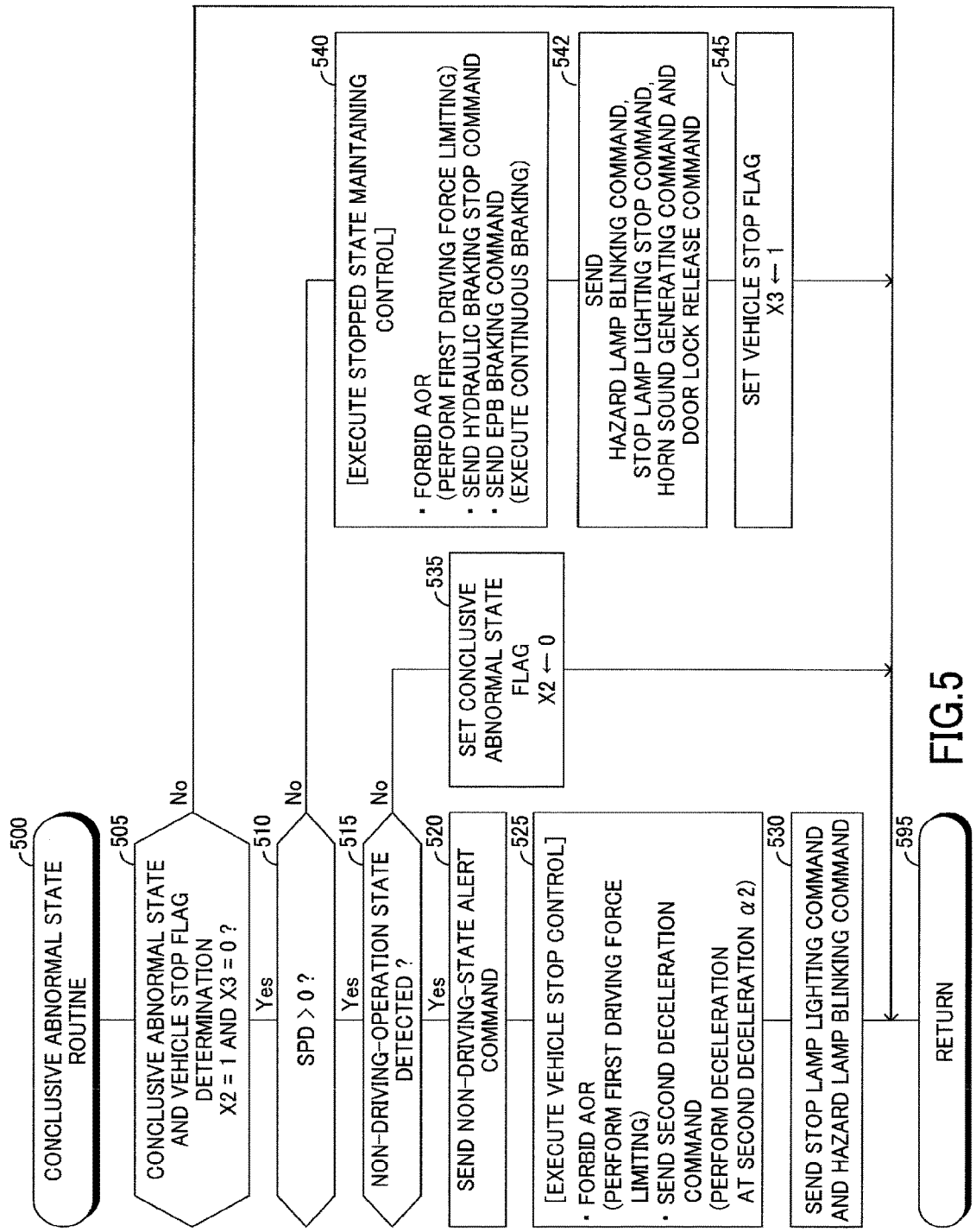
FIG. 5 is a flowchart for showing a conclusive abnormal state routine executed by the CPU.

Further, the CPU is configured or programmed to execute a conclusive abnormal state routine shown by a flowchart in FIG. 5 each time the predetermined time dT elapses. Therefore, at a predetermined timing, the CPU starts a process from a step 500 and then, proceeds with the process to a step 505 to determine whether or not the value of the conclusive abnormal state flag X2 is "1" and a value of a vehicle stop flag X3 is "0".

The value of the vehicle stop flag X3 is set to "1" by a process of a step 545 described later when the CPU determines "No" at a step 510 described later after the own vehicle forcibly stops by a process of a step 525 described later. On the other hand, when the stop of the stopped state maintaining control is permitted by a process of a step 620 in FIG. 6 described later after the stopped state maintaining control starts, the value of the vehicle stop flag X3 is set to "0" by a process of a step 625 in FIG. 6 described later.

Therefore, immediately after the value of the conclusive abnormal state flag X2 is set to "1" at the step 430 in FIG. 4, the own vehicle does not stop and thus, the value of the vehicle stop flag X3 is "0". In this case, the CPU determines "Yes" at the step 505 and then, proceeds with the process to a step 510.

When the CPU proceeds with the process to the step 510, the CPU determines whether or not the vehicle speed SPD is larger than zero, that is, the own vehicle travels. When the process of the step 510 is first executed, the own vehicle does not stop. In this case, the CPU determines "Yes" at the step 510 and then, proceeds with the process to a step 515.

When the CPU proceeds with the process to the step 515, the CPU determines whether or not the non-driving-operation state is detected. The process of the step 515 may be the same as the processes of the step 315 in FIG. 3 and the step 410 in FIG. 4 or may be configured to additionally include a condition that the driving operation is surely detected.

When the non-driving-operation state is detected, the CPU determines "Yes" at the step 515 and then, sequentially executes processes of steps 520 to 530 described below. Then, the CPU proceeds with the process to a step 595 to terminate this routine once.

Step 520: The CPU sends the non-driving-operation alert command to the alert ECU 80. Thereby, the alert ECU 80 performs the non-driving-operation alert by using the buzzer 81 and the display device 82. The non-driving-operation alert performed at the step 520 may be the same as the non-driving-operation alert performed at the step 415 in FIG. 4 or may be configured such that a level of the alerting increases, compared with the non-driving-operation alert performed at the step 415 (for example, a level of the sound generated by the buzzer 81 increases).

Step 525: The CPU executes the vehicle stop control. In particular, the CPU forbids the AOR and sends, to the brake ECU 40, a second deceleration command for causing the brake ECU 40 to decelerate the own vehicle at the predetermined second constant deceleration α2.

In a state that the CPU forbids the AOR, the CPU sets the supply request torque TQdreq to zero and sends, to the engine ECU 30, an output command for causing the engine 32 to output a torque corresponding to the idling torque even when the value of the acceleration pedal operation amount AP is larger than zero, that is, the value of the driver request torque TQd (i.e., the value of the driver request driving force) is larger than zero. When receiving the output command, the engine ECU 30 activates the engine actuators 31 such that the engine 32 outputs the torque corresponding to the idling torque.

When receiving the second deceleration command, the brake ECU 40 activates the brake actuator 41 such that the own vehicle is decelerated at the predetermined second constant deceleration α2. In this embodiment, the predetermined second constant deceleration α2 is set such that the absolute value of the predetermined second constant deceleration α2 is larger than the absolute value of the predetermined first constant deceleration α1.

Step 530: The CPU sends, to the meter ECU 70, a lighting command for lighting the stop lamp 72 and a blinking command for blinking the hazard lamp 71. Thereby, the meter ECU 70 lights the stop lamp 72 and blinks the hazard lamp 71. Thereby, a driver of a vehicle following the own vehicle can be alerted.

The driving assist ECU 10 decelerates the own vehicle by executing the aforementioned processes repeatedly.

When the driving operation of the driver is detected upon an execution of the process of the step 515, the CPU determines "No" at the step 515 and then, executes a process of a step 535 described below. Then, the CPU proceeds with the process to the step 595 to terminate this routine once.

Step 535: The CPU sets the value of the conclusive abnormal state flag X2 to "0". Thereby, the deceleration control, the alerting for the driver of the own vehicle and the alerting for the driver of the vehicle following the own vehicle are stopped and a normal vehicle control for controlling the traveling of the own vehicle only on the basis of the driving operation of the driver of the own vehicle is started. Therefore, the lane keeping control and the following-travel inter-vehicle-distance control are executed, depending on a setting state of the operation switch 18.

The CPU may be configured or programmed not to execute the process of the step 535 when the driving operation of the driver of the own vehicle is detected during the execution of the vehicle stop control. For example, when the driving operation of the driver of the own vehicle is detected during the execution of the vehicle stop control, the CPU may be configured or programmed to continue to decelerate the own vehicle at the predetermined second constant deceleration α2 while forbidding the AOR and set the value of the conclusive abnormal state flag X2 to "0" after the own vehicle stops.

When no detection of the driving operation of the driver continues and then, the own vehicle is stopped by the deceleration at the predetermined second constant deceleration α2, that is, the vehicle speed SPD of the own vehicle becomes zero, the CPU determines "No" at the step 510 and then, sequentially executes processes of steps 540 to 545 described below. Then, the CPU proceeds with the process to the step 595 to terminate this routine once.

Step 540: The CPU executes the stopped state maintaining control. In particular, the CPU forbids the AOR, sends a hydraulic braking stop command to the brake ECU 40 and sends an EPB braking command to the electric powered parking brake ECU 50.

When the value of the driver request torque TQd (i.e., the driver request driving force) is larger than zero while the CPU forbids the AOR, the CPU sets the supply request torque TQdreq to zero and sends, to the engine ECU 30, the output command for causing the engine 32 to output the torque corresponding to the idling torque. When receiving the output command, the engine ECU 30 activates the engine actuators 31 such that the engine 32 outputs the torque corresponding to the idling torque.

When receiving the hydraulic braking stop command, the brake ECU 40 causes the friction brake mechanism 42 to stop the hydraulic braking. When receiving the EPB braking command, the electric powered parking brake ECU 50 activates the parking brake actuator 51 to perform the EPB braking (i.e., a continuous braking).

Step 542: The CPU sends a hazard lamp blinking command and a stop lamp lighting stop command to the meter ECU 70 and sends a horn sound generation command and a door lock release command to the body ECU 90.

When receiving the hazard lamp blinking command and the stop lamp lighting stop command, the meter ECU 70 blinks the hazard lamp 71 and stops the lighting of the stop lamp 72. When receiving the horn sound generation command and the door lock release command, the body ECU 90 causes the horn 92 to generate the sound and causes the door lock device 91 to release the door lock.

Step 545: The CPU sets the value of the vehicle stop flag X3 to "1". The vehicle stop flag X3 indicates that the own vehicle is forcibly stopped by the vehicle stop control when the value of the vehicle stop flag X3 is "1".

Figure 6:
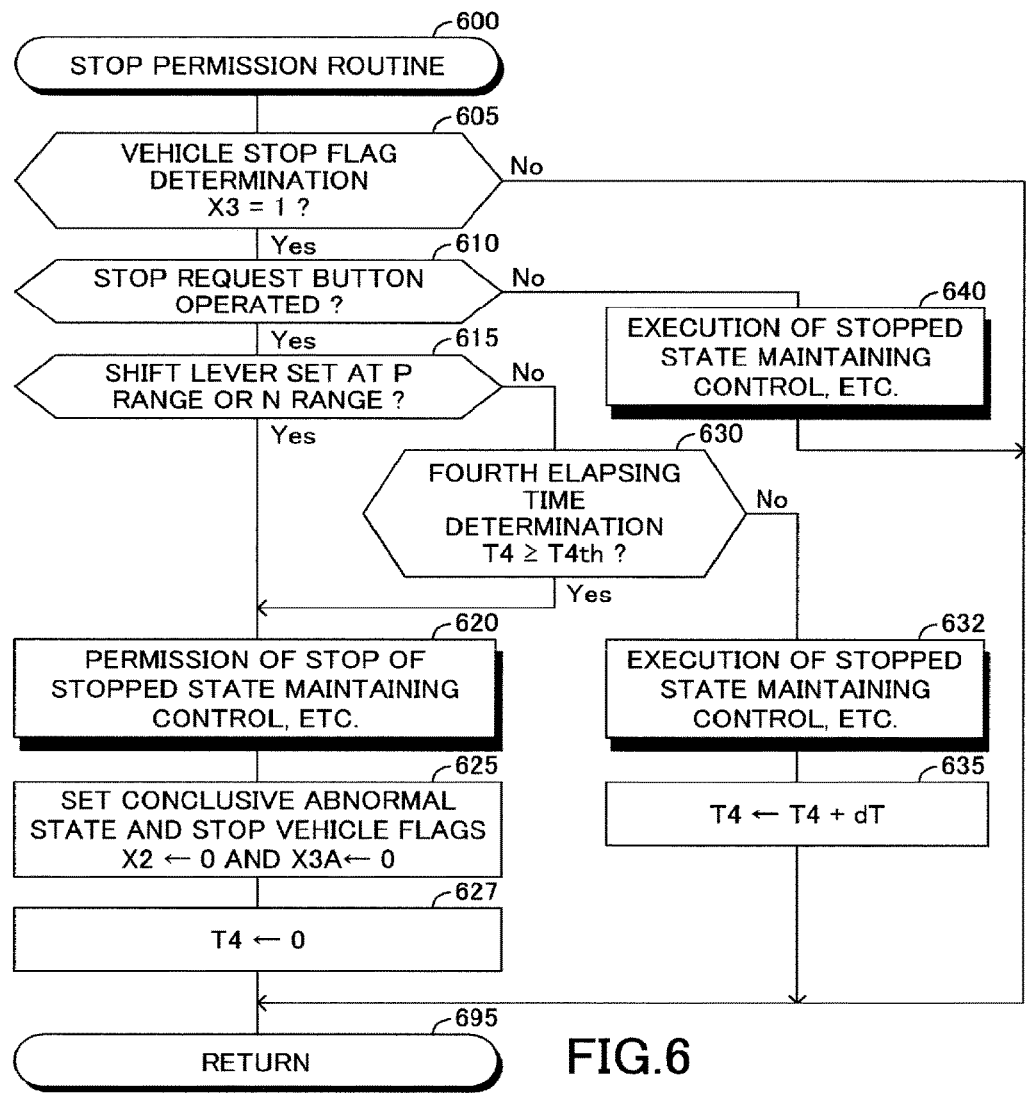
FIG. 6 is a flowchart for showing a stop permission routine executed by the CPU.

Further, the CPU is configured or programmed to execute a stop permission routine shown by a flowchart in FIG. 6 each time the predetermined time dT elapses. Therefore, at a predetermined timing, the CPU start a process from a step 600 and then, proceeds with the process to a step 605 to determine whether or not the value of the vehicle stop flag X3 is "1". When the value of the vehicle stop flag X3 is "1", the CPU determines "Yes" at the step 605 and then, proceeds with the process to a step 610 to determine whether or not the stop request button 20 is operated after the own vehicle is stopped by the process of the step 525 in FIG. 5.

When the stop request button 20 is operated after the own vehicle is stopped, the CPU determines "Yes" at the step 610 and then, proceeds with the process to a step 615 to determine whether or not the shift lever 21 is set at any of the P and N ranges.

When the shift lever 21 is set at any of the P and N ranges, the CPU determines "Yes" at the step 615 and then, executes a process of a step 620 described below.

Figure 7:
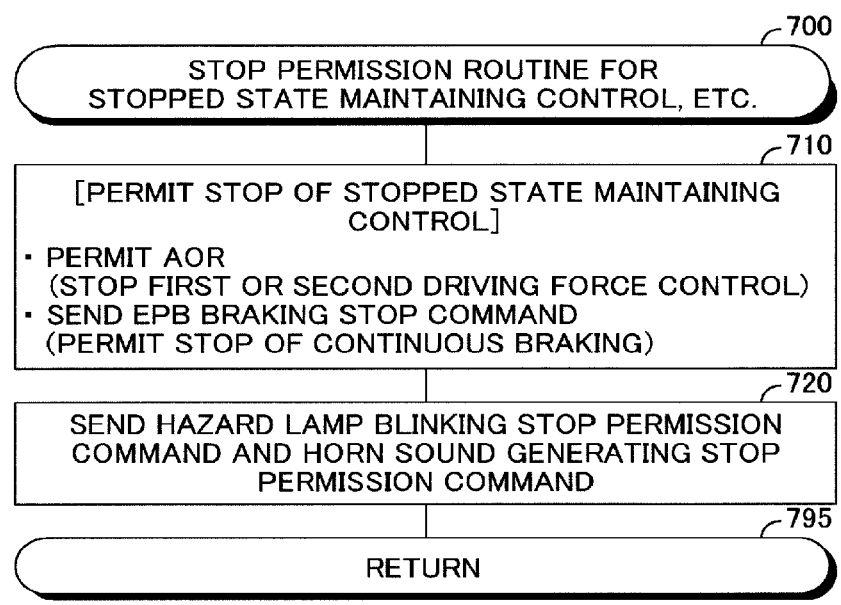
FIG. 7 is a flowchart for showing a part of the stop permission routine executed by the CPU.

Step 620: The CPU executes a routine shown by a flowchart in FIG. 7 to permit the stop of the stopped state maintaining control and the like. Therefore, when the CPU proceeds with the process to the step 620, the CPU starts a process from a step 700 and then, sequentially executes processes of steps 710 and 720 described below.

Step 710: The CPU permits the stop of the stopped state maintaining control. In particular, the CPU permits the AOR and sends an EPB braking stop permission command to the electric powered parking brake ECU 50.

When permitting the AOR, the CPU sets the driver request torque TQd as the supply request torque TQdreq and sends, to the engine ECU 30, the output command for causing the engine 32 to output the torque corresponding to the supply request torque TQdreq. When receiving the output command, the engine ECU 30 activates the engine actuators 31 such that the engine 32 outputs the torque corresponding to the supply request torque TQdreq. When receiving the EPB braking stop permission command and then, the cancelling switch 53 is operated, the electric powered parking brake ECU 50 stops the EPB braking. Thereby, the stopped state maintaining control is terminated.

Step 720: The CPU sends a hazard lamp blinking stop permission command to the meter ECU 70 and sends a horn sound-generation stop permission command to the body ECU 90.

When receiving the hazard lamp blinking stop permission command and then, the hazard lamp switch 73 is operated, the meter ECU 70 stops the blinking of the hazard lamp 71. When receiving the horn sound-generation stop permission command and then, the horn switch 93 is operated, the body ECU 90 stops the sound generation performed by the horn 92.

After the CPU executes the process of the step 720, the CPU returns the process to the routine shown in FIG. 6 via a step 795 and then, sequentially executes processes of steps 625 and 627 described below. Then, the CPU proceeds with the process to a step 695 to terminate this routine once.

Step 625: The CPU sets the values of the conclusive abnormal state and vehicle stop flags X2 and X3 to "0", respectively.

Step 627: The CPU clears a fourth elapsing time which corresponds to a time elapsing from a time when the stop request button 20 is operated while the shift lever 21 is set at the range other than the P and N ranges after the own vehicle is stopped by the process of the step 525 in FIG. 5. The fourth elapsing time T4 is used at a step 630 described below.

When the shift lever 21 is set at any of the D and R ranges upon an execution of the step 615, the CPU determines "No" at the step 615 and then, proceeds with the process to a step 630 to determine whether or not the fourth elapsing time T4 is equal to or larger than a fourth threshold time T4.

Immediately after the stop request button 20 is operated while the shift lever 21 is set at any of the D and R ranges after the own vehicle is stopped by the vehicle stop control, the fourth elapsing time T4 is smaller than the fourth threshold time T4*th*. In this case, the CPU determines "No" at the step 630 and then, executes a process of a step 632 described below.

Figure 8:
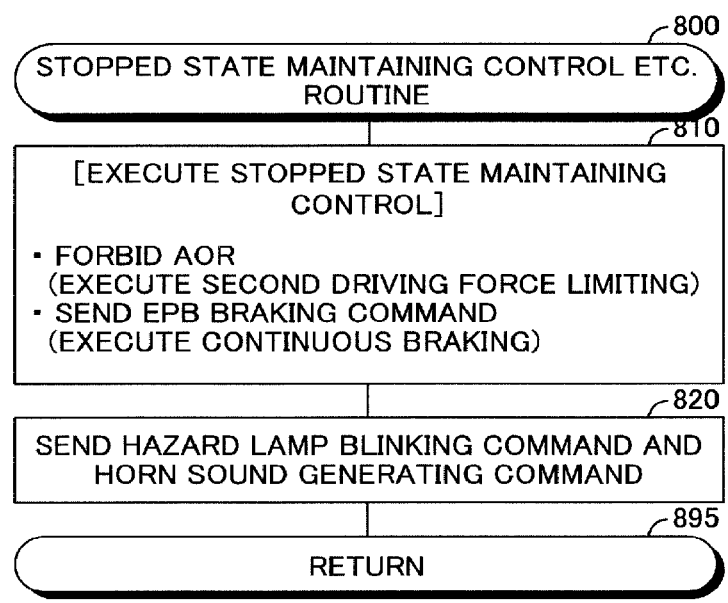
FIG. 8 is a flowchart for showing a part of the stop permission routine executed by the CPU.

Step 632: The CPU executes the stopped state maintaining control and the like by executing a routine shown by a flowchart in FIG. 8.

Therefore, when the CPU proceeds with the process to the step 632, the CPU starts a process from a step 800 and then, sequentially executes processes of steps 810 and 820 described below.

Step 810: The CPU executes the stopped state maintaining control. In particular, the CPU forbids the AOR and sends the EPB braking command to the electric powered parking brake ECU 50.

When the CPU forbids the AOR and the value of the driver request torque TQd (i.e., the driver request driving force) is larger than zero, the CPU sets the supply request torque TQdreq to zero and sends, to the engine ECU 30, the output command for causing the engine 32 to output the torque corresponding to the idling torque. When receiving the output command, the engine ECU 30 activates the engine actuators such that the engine 32 outputs the torque corresponding to the idling torque. When receiving the EPB braking command, the electric powered parking brake ECU 50 activates the parking brake actuator 51 to perform the EPB braking (i.e., the continuous braking).

Step 820: The CPU sends the hazard lamp blinking command to the meter ECU 70 and sends the horn sound generating command to the body ECU 90.

When receiving the hazard lamp blinking command, the meter ECU 70 blinks the hazard lamp 71. When receiving the horn sound generating command, the body ECU 90 causes the horn 92 to generate the sounds.

After the CPU executes the process of the step 820, the CPU returns the process to the routine shown in FIG. 6 via a step 895 and then, executes a process of a step 635 described below. Then, the CPU proceeds with the process to the step 695 to terminate this routine once.

Step 635: The CPU increases the fourth elapsing time T4 by the predetermined time dT. The predetermined time dT is equal to the predetermined time dT which corresponds to an execution cycle of this stop permission routine.

On the other hand, when the fourth elapsing time T4 is equal to or larger than the fourth threshold time T4*th*, the CPU determines "Yes" at the step 630 and then, sequentially executes processes of steps 620 to 627 described below. Thereby, the AOR, the stop of the EPB braking, the stop of the blinking of the hazard lamp 71 and the stop of the sound generation performed by the horn 92 are permitted. Then, the CPU proceeds with the process to the step 695 to terminate this routine once.

Further, when the stop request button 20 is not operated upon an execution of the process of the step 610, the CPU determines "No" at the step 610 and then, executes a process of a step 640 described below. Then, the CPU proceeds with the process to the step 695 to terminate this routine once.

Figure 9:
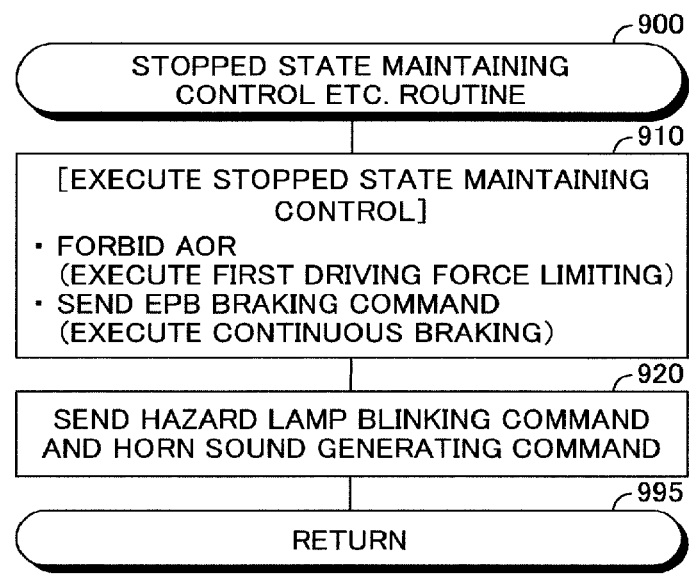
FIG. 9 is a flowchart for showing a part of the stop permission routine executed by the CPU.

Step 640: The CPU executes the stopped state maintaining control and the like by executing a routine shown by a flowchart in FIG. 9.

Therefore, when the CPU proceeds with the process to the step 640, the CPU starts a process from a step 900 and then, sequentially executes processes of steps 910 and 920.

Step 910: The CPU executes the stopped state maintaining control. In particular, the CPU forbids the AOR and sends the EPB braking command to the electric powered parking brake ECU 50.

When the CPU forbids the AOR and the value of the driver request torque TQd (i.e., the driver request driving force) is larger than zero, the CPU sets the supply request torque TQdreq to zero and sends, to the engine ECU 30, the output command for causing the engine 32 to output the torque corresponding to the idling torque. When receiving the output command, the engine ECU 30 activates the engine actuators 31 such that the engine 32 outputs the torque corresponding to the idling torque. When receiving the EPB braking command, the electric powered parking brake ECU 50 activates the parking brake actuator 51 to perform the EPB braking (i.e., the continuous braking).

Step 920: The CPU sends the hazard lamp blinking command to the meter ECU 70 and sends the horn sound generating command to the body ECU 90.

When receiving the hazard lamp blinking command, the meter ECU 70 blinks the hazard lamp 71. When receiving the horn sound generating command, the body ECU 90 causes the horn 92 to generate the sounds.

When the value of the vehicle stop flag X3 is "0" upon an execution of the process of the step 605, the CPU determines "No" at the step 605 and then, proceeds with the process directly to the step 695 to terminate this routine once.

The concrete operation of the embodiment apparatus has been described. With the routines shown in FIGS. 3 to 5, when the driver is under the abnormal state that the driver loses his/her ability of driving the own vehicle (refer to the determination "Yes" at the step 515 in FIG. 5), the own vehicle is braked to be stopped (refer to the process of the step 525 in FIG. 5).

With the routines shown in FIGS. 6 to 9, when the stop of the stopped state maintaining control is requested during the execution of the stopped state maintaining control (refer to the determination "Yes" at the step 610) while the shift lever 21 is set at the range other than the P and N ranges, i.e., at the D or R range (refer to the determination "No" at the step 615), the AOR continues to be forbidden and the EPB braking continues to be performed (refer to the process of the step 632 in FIG. 6). Thus, the own vehicle can be prevented from being suddenly accelerated.

It should be noted that the present invention is not limited to the aforementioned embodiment and various modifications can be employed within the scope of the present invention.

The embodiment apparatus performs the abnormal determination of the driver on the basis of the time of the continuation of the non-driving-operation state, however the embodiment apparatus may be configured or programmed to perform the abnormal determination of the driver by using so-called driver monitor technique, for example, described in JP 2013-152700. In this case, a camera for taking an image of the driver of the own vehicle is provided on a member (for example, the steering wheel, a pillar and the like) inside the own vehicle. The driving assist ECU 10 monitors a direction of a line of sight of the driver or the face of the driver by using the image taken by the camera. The driving assist ECU 10 determines that the driver is under the abnormal state when the direction of the line of the sight of the driver or the face of the driver continues to be a direction which the line of the sight of the driver or the face of a driver under the normal state does not direct for over a predetermined time. This abnormal state determination using the image taken by the camera can be used for the determination of the provisional abnormal state (refer to the process of the step 315 in FIG. 3) and the determination of the conclusive abnormal state (refer to the process of the step 410 in FIG. 4).

Further, the step 630 in FIG. 6 may be omitted. In this case, the forbidding of the AOR, the EPB braking, the blinking of the hazard lamp 71 and the sound generation performed by the horn 92 are continued until the setting position of the shift lever 21 changes to any of the P and N ranges.

Furthermore, the embodiment apparatus may be configured or programmed to limit the supply request torque TQdreq (i.e., the supply requested driving force) to a value which is larger than a first torque TQ1 (i.e., a first driving force) (in this example, zero) and equal to or smaller than a second torque TQ2 (i.e., a second driving force) smaller than the driver request torque TQd (i.e., the driver request driving force) in place of setting the supply request torque TQdreq (i.e., the supply requested driving force) to zero when the driver request torque TQd (i.e., the driver requested driving force) is larger than zero.

In particular, the embodiment apparatus may be configured or programmed to execute the stopped state maintaining control for maintaining the own vehicle at the stopped state by performing the EPB braking and a first torque limiting (i.e., a first driving force limiting) for limiting the supply request torque TQdreq (i.e., the supply requested driving force) to a torque which is equal to or smaller than the first torque TQ1 (i.e., the first driving force) smaller than the driver request torque TQd (i.e., the driver request driving force) when the own vehicle is stopped by the vehicle stop control.

In addition, the embodiment apparatus may be configured or programmed to perform a second torque limiting (i.e., a second driving force limiting) for limiting the supply request torque TQdreq (i.e., the supply request driving force) to a torque which is equal to or smaller than the second torque TQ2 larger than the first torque TQ1 (i.e., the first driving force) and smaller than the driver request torque TQd (i.e., the driver request driving force) when the stop of the stopped state maintaining control is requested by the operation of the stop request button 20 during the execution of the stopped state maintaining control while the shift lever 21 is set at the range other than the P and N ranges, i.e., at the D or R range.

In this case, the first torque TQ1 (i.e., the first driving force) is preferably set to a value which is positive near and equal to or larger than zero and the second torque TQ2 (i.e., the second driving force) is preferably set to a value which is positive near and equal to or larger than zero.

Furthermore, the embodiment apparatus may be configured or programmed to continue the forbidding of the AOR and permit the stop of the EPB braking in place of continuing the forbidding of the AOR and the EPB braking when the stop of the stopped state maintaining control is requested by the operation of the stop request button 20 while the shift lever 21 is set at the range other than the P and N ranges, that is, at the D or R range.

What is claimed is:

1. A vehicle traveling control apparatus applied to a vehicle comprising:
   a shift lever;
   drive wheels;
   a driving force supplying device for supplying, to the drive wheels, a driving force for traveling the vehicle;
   a braking force applying device for applying, to the vehicle, a braking force for braking the vehicle; and
   an electric control unit configured:
   to continuously determine whether or not a driver of the vehicle is under an abnormal state that the driver loses an ability of driving the vehicle;
   to execute a vehicle stop control to stop the vehicle by causing the braking force applying device to apply the braking force to the vehicle after the electric control unit determines that the driver is under the abnormal state;
   to perform a first driving force limiting control to limit a supply request driving force for the driving force supplying device to supply to the drive wheels by limiting a driver request driving force requested by the driver to a value equal to or smaller than a first driving force that is smaller than the driver request driving force;
   to execute a stopped state maintaining control to maintain the vehicle at a stopped state by performing a continuous braking control to continuously apply the braking force to the vehicle by the braking force applying device when the electric control unit stops the vehicle by the vehicle stop control;
   to stop the first driving force limiting control when a stop of the stopped state maintaining control is requested during an execution of the stopped state maintaining control while the shift lever is set at any of a parking range and a neutral range; and
   to stop the first driving force limiting control and perform a second driving force limiting control to limit the supply request driving force to a value equal to or smaller than a second driving force which is equal to or larger than the first driving force and is smaller than the driver request driving force when the stop of the stopped state maintaining control is requested during the execution of the stopped state maintaining control while the shift lever is set at a range other than the parking and neutral ranges.

2. The vehicle traveling control apparatus according to claim 1, wherein the second driving force is equal to the first driving force.

3. The vehicle traveling control apparatus according to claim 1, wherein the electric control unit is configured to stop the second driving force limiting control when a predetermined threshold time elapses from a time when the electric control unit starts the second driving force limiting control.

4. The vehicle traveling control apparatus according to claim 1, wherein the electric control unit is configured to permit a stop of the continuous braking control when the stop of the stopped state maintaining control is requested during the execution of the stopped state maintaining control while the shift lever is set at any of the parking and neutral ranges.

5. A vehicle traveling control apparatus applied to a vehicle comprising:
   a shift lever;
   drive wheels;
   a driving force supplying device for supplying, to the drive wheels, a driving force for traveling the vehicle;
   a braking force applying device for applying, to the vehicle, a braking force for braking the vehicle; and
   an electric control unit configured:
      to continuously determine whether or not a driver of the vehicle is under an abnormal state that the driver loses an ability of driving the vehicle;
      to execute a stopped state maintaining control to stop the vehicle by causing the braking force applying device to apply the braking force to the vehicle after the electric control unit determines that the driver is under the abnormal state;
      to perform a driving force limiting control to limit a supply request driving force for the driving force supplying device to supply to the drive wheels by limiting a driver request driving force requested by the driver to a value equal to or smaller than a predetermined driving force that is smaller than the driver request driving force;
      to execute a stopped state maintaining control to maintain the vehicle at a stopped state by continuously applying the braking force to the vehicle by the braking force applying device when the electric control unit stops the vehicle by the vehicle stop control; and
      to permit a stop of the stopped state maintaining control when the stop of the stopped state maintaining control is requested during an execution of the stopped state maintaining control while the shift lever is set at any of a parking range and a neutral range.

6. The vehicle traveling control apparatus according to claim 5, wherein the electric control unit is configured to forbid the stop of the stopped state maintaining control when the stop of the stopped state maintaining control is requested during the execution of the stopped state maintaining control while the shift lever is set at a range other than the parking and neutral ranges.

7. The vehicle traveling control apparatus according to claim 6, wherein the electric control unit is configured to permit the stop of the stopped state maintaining control when a predetermined threshold time elapses from a time when the electric control unit forbids the stop of the stopped state maintaining control.

* * * * *